United States Patent
Gottumukkala et al.

(10) Patent No.: US 11,078,376 B2
(45) Date of Patent: Aug. 3, 2021

(54) POLYURETHANE COATING COMPOSITIONS CONTAINING 1,1-DI-ACTIVATED VINYL COMPOUNDS AND RELATED COATINGS AND PROCESSES

(71) Applicant: PPG Industries Ohio, Inc., Cleveland, OH (US)

(72) Inventors: Aditya Gottumukkala, Monroeville, PA (US); Scott W. Sisco, Glenshaw, PA (US); David R. Fenn, Allison Park, PA (US); Daniel F. Moyano, Pittsburgh, PA (US); Kurt G. Olson, Gibsonia, PA (US); Matthew S. Luchansky, Wexford, PA (US); Richard J. Sadvary, Tarentum, PA (US); Shiryn Tyebjee, Tarentum, PA (US); Caroline S. Harris, Pittsburgh, PA (US); Shanti Swarup, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 194 days.

(21) Appl. No.: 16/320,604

(22) PCT Filed: Jul. 26, 2017

(86) PCT No.: PCT/US2017/043995
§ 371 (c)(1),
(2) Date: Jan. 25, 2019

(87) PCT Pub. No.: WO2018/022780
PCT Pub. Date: Feb. 1, 2018

(65) Prior Publication Data
US 2019/0161640 A1    May 30, 2019

Related U.S. Application Data

(60) Provisional application No. 62/366,781, filed on Jul. 26, 2016, provisional application No. 62/379,770, filed on Aug. 26, 2016.

(51) Int. Cl.
| | | |
|---|---|---|
| *C09D 175/04* | (2006.01) | |
| *B05D 7/00* | (2006.01) | |
| *C09D 7/63* | (2018.01) | |
| *C08G 18/48* | (2006.01) | |
| *C08G 18/66* | (2006.01) | |
| *C08G 18/79* | (2006.01) | |
| *C08G 71/04* | (2006.01) | |
| *C08G 18/75* | (2006.01) | |
| *C09D 133/00* | (2006.01) | |
| *C08G 18/40* | (2006.01) | |
| *C09D 133/10* | (2006.01) | |
| *C08K 5/00* | (2006.01) | |
| *B05D 3/02* | (2006.01) | |

(52) U.S. Cl.
CPC .......... *C09D 175/04* (2013.01); *B05D 7/572* (2013.01); *B05D 7/574* (2013.01); *C08G 18/4018* (2013.01); *C08G 18/4854* (2013.01); *C08G 18/6692* (2013.01); *C08G 18/755* (2013.01); *C08G 18/792* (2013.01); *C08G 18/797* (2013.01); *C08G 71/04* (2013.01); *C09D 7/63* (2018.01); *C09D 133/00* (2013.01); *C09D 133/10* (2013.01); *B05D 3/0254* (2013.01); *B05D 7/534* (2013.01); *B05D 7/542* (2013.01); *B05D 2202/10* (2013.01); *B05D 2401/20* (2013.01); *B05D 2503/00* (2013.01); *B05D 2508/00* (2013.01); *C08K 5/0025* (2013.01)

(58) Field of Classification Search
None
See application file for complete search history.

(56) References Cited

U.S. PATENT DOCUMENTS

| | | | |
|---|---|---|---|
| 3,197,318 | A | 7/1965 | Halpern, et al. |
| 3,660,263 | A | 5/1972 | Auletta et al. |
| 4,382,109 | A | 5/1983 | Olson et al. |
| 4,452,861 | A | 6/1984 | Okamoto et al. |
| 4,740,534 | A | 4/1988 | Matsuda et al. |
| 4,885,191 | A | 12/1989 | Podszun et al. |
| 5,321,112 | A | 6/1994 | Olson |

(Continued)

FOREIGN PATENT DOCUMENTS

| | | |
|---|---|---|
| CN | 102796909 A | 11/2012 |
| CN | 103520771 A | 1/2014 |

(Continued)

OTHER PUBLICATIONS

International Search Report and Written Opinion for International Patent Application No. PCT/EP2017/044010, dated Oct. 30, 2017.
International Search Report and Written Opinion for International Patent Application No. PCT/EP2017/044041, dated Nov. 7, 2017.
International Search Report and Written Opinion for International Patent Application No. PCT/EP2017/044001, dated Oct. 30, 2017.
International Search Report and Written Opinion for International Patent Application No. PCT/EP2017/044032, dated Nov. 6, 2017.
International Search Report and Written Opinion for International Patent Application No. PCT/EP2017/044014, dated Oct. 27, 2017.

(Continued)

*Primary Examiner* — Shamim Ahmed
*Assistant Examiner* — Bradford M Gates
(74) *Attorney, Agent, or Firm* — K&L Gates LLP

(57) ABSTRACT

Polyisocyanate-cured coating compositions containing 1,1-di-activated vinyl compounds are described. Also provided are coatings formed from coating compositions comprising 1,1-di-activated vinyl compounds, including multi-layer coatings. Also provided are processes for coating substrates with coating compositions comprising 1,1-di-activated vinyl compounds. Also provided are articles employing the coatings described herein.

21 Claims, No Drawings

(56) References Cited

U.S. PATENT DOCUMENTS

| | | |
|---|---|---|
| 5,639,828 A | 6/1997 | Briggs et al. |
| 5,723,275 A | 3/1998 | Wang et al. |
| 6,517,940 B1 | 2/2003 | Millero et al. |
| 8,609,885 B2 | 12/2013 | Malofsky et al. |
| 8,884,051 B2 | 11/2014 | Malofsky et al. |
| 9,108,914 B1 | 8/2015 | Malofsky et al. |
| 9,181,365 B2 | 11/2015 | Malofsky et al. |
| 9,221,739 B2 | 12/2015 | Malofsky et al. |
| 9,334,430 B1 | 5/2016 | Stevenson et al. |
| 9,416,091 B1 | 8/2016 | Sullivan et al. |
| 9,567,475 B1 | 2/2017 | Palsule et al. |
| 2003/0030170 A1 | 2/2003 | Abe et al. |
| 2003/0042142 A1 | 3/2003 | Yamoto et al. |
| 2005/0171273 A1 | 8/2005 | Ledwidge et al. |
| 2014/0275419 A1 | 9/2014 | Ward et al. |
| 2014/0288230 A1 | 9/2014 | Malofsky et al. |
| 2014/0329980 A1 | 11/2014 | Malofsky et al. |
| 2015/0056879 A1 | 2/2015 | Malofsky et al. |
| 2015/0064476 A1* | 3/2015 | Kanda ............... C08G 18/423 428/423.1 |
| 2015/0168618 A1* | 6/2015 | Nakajima ............. G02B 5/282 359/359 |
| 2015/0361283 A1 | 12/2015 | Molofsky B et al. |
| 2015/0368484 A1* | 12/2015 | Shishaku ............... C09D 7/43 427/385.5 |
| 2016/0068618 A1 | 3/2016 | Sullivan et al. |
| 2018/0094115 A1 | 4/2018 | Martz et al. |
| 2019/0153244 A1 | 5/2019 | Puodziukynaite et al. |
| 2019/0160739 A1 | 5/2019 | Olson et al. |
| 2019/0161620 A1 | 5/2019 | Zalich et al. |
| 2019/0161637 A1 | 5/2019 | Olson et al. |

FOREIGN PATENT DOCUMENTS

| | | | |
|---|---|---|---|
| CN | 104312246 A | 1/2015 | |
| CN | 105536049 A | 5/2016 | |
| CN | 105585879 A | 5/2016 | |
| EP | 0046088 A1 | 2/1982 | |
| EP | 0327129 A1 | 8/1989 | |
| EP | 0829756 A2 | 7/1999 | |
| EP | 3042939 A1 | 7/2016 | |
| JP | 2008019350 A | 1/2008 | |
| JP | 2013100599 A | 5/2013 | |
| JP | 2014077024 A | 5/2014 | |
| KR | 20140145084 A | 12/2014 | |
| WO | 0032709 A1 | 6/2000 | |
| WO | 2008086033 A1 | 7/2008 | |
| WO | 2013036347 A1 | 3/2013 | |
| WO | 2013059473 A2 | 4/2013 | |
| WO | 2013149173 A1 | 10/2013 | |
| WO | WO-2014119781 A1 * | 8/2014 | ............ C09D 133/06 |
| WO | 2015165808 A1 | 11/2015 | |
| WO | 2017210415 A1 | 12/2017 | |
| WO | 2018022804 A1 | 2/2018 | |
| WO | 2018022810 A1 | 2/2018 | |

OTHER PUBLICATIONS

International Search Report and Written Opinion for International Patent Application No. PCT/EP2017/044005, dated Nov. 3, 2017.
Triallyl Isocyanurate TAIC Product Description, Mitsubishi International PolymerTrade Corporation, http://www.michem.com/triallyl_isocyanurate.html, 6 pages, Apr. 4, 2019.
Notification of Transmittal of the International Search Report and the Written Opinion of the International Searching Authority for International Application No. PCT/US2017/043995, 14 pages.

* cited by examiner

POLYURETHANE COATING COMPOSITIONS CONTAINING 1,1-DI-ACTIVATED VINYL COMPOUNDS AND RELATED COATINGS AND PROCESSES

CROSS-REFERENCE TO RELATED APPLICATIONS

This Application claims the benefit of U.S. Provisional Application No. 62/379,770, entitled "POLYURETHANE COATING COMPOSITIONS CONTAINING 1,1-DI-ACTIVATED VINYL COMPOUNDS AND RELATED COATINGS AND PROCESSES", filed Aug. 26, 2016, and U.S. Provisional Application No. 62/366,781, entitled "COATING COMPOSITIONS CONTAINING 1,1-DI-ACTIVATED VINYL COMPOUNDS AND RELATED COATINGS AND PROCESSES", filed Jul. 26, 2016, the contents of which are hereby incorporated by reference herein in its entirety.

BACKGROUND OF THE INVENTION

Coating compositions are used to form coating layers that are applied to a wide variety of substrates to provide color and/or other visual effects, corrosion resistance, abrasion resistance, chemical resistance, and the like. For example, multi-layer coatings often include a basecoat layer that can provide color and/or other visual effects and a topcoat layer, which sometimes comprises a clearcoat layer, and which provides an abrasion and scratch resistant layer. With respect to multi-layer coatings applied to metal substrates, such as automotive, aerospace, and architectural substrates, for example, a primer layer and/or a surface passivation layer may be applied to the bare metal substrate underneath overlying basecoats and topcoats. It would be advantageous to provide coating compositions that form coatings, including multi-layer coatings, characterized by low cure temperatures, novel curing mechanisms, and/or improved coating properties.

SUMMARY OF THE INVENTION

A coating composition comprises (A) a polyol resin and (B) a crosslinker composition. The crosslinker composition comprises (b1) a polyisocyanate compound and (b2) a 1,1-di-activated vinyl compound, or a multifunctional form thereof, or a combination thereof. A mixture of components (A) and (B) form a polyurethane coating composition. A coating crosslinker composition comprises a polyisocyanate compound and a 1,1-di-activated vinyl compound, or a multifunctional form thereof, or a combination thereof.

A multi-layer coating comprises a first coating layer applied over at least a portion of a substrate and a second coating layer applied over at least a portion of the first coating layer. The second coating layer comprises a reaction product of a polyol resin and a polyisocyanate. The second coating layer also comprises one or more of an addition reaction product of a polyol resin and a 1,1-di-activated vinyl compound, or a multifunctional form thereof, or a combination thereof, and/or a polymerization reaction product of the 1,1-di-activated vinyl compound, or a multifunctional form thereof, or a combination thereof.

A process for coating a substrate comprises applying a first coating layer over at least a portion of a substrate, applying a second coating layer over at least a portion of the first coating layer, and curing the second coating layer. The second coating layer comprises a coating composition comprising a polyol resin, a polyisocyanate, and a 1,1-di-activated vinyl compound, or a multifunctional form thereof, or a combination thereof. The invention described in this specification also relates to articles employing the coatings described herein.

It is understood that the invention described in this specification is not necessarily limited to the examples summarized in this Summary.

DETAILED DESCRIPTION OF THE INVENTION

As used in this specification, particularly in connection with coating layers or films, the terms "on," "onto," "over," and variants thereof (e.g., "applied over," "formed over," "deposited over," "provided over," "located over," and the like), mean applied, formed, deposited, provided, or otherwise located over a surface of a substrate, but not necessarily in contact with the surface of the substrate. For example, a coating layer "applied over" a substrate does not preclude the presence of one or more other coating layers of the same or different composition located between the applied coating layer and the substrate. Likewise, a second coating layer "applied over" a first coating layer does not preclude the presence of one or more other coating layers of the same or different composition located between the applied second coating layer and the applied first coating layer.

In addition, when used in the specification, a "first coating layer" or "second coating layer" may include, separately, one or more coating applications to form either the first or second coating layer. Accordingly a "coating layer" as identified herein does not preclude the presence of one or more other coating applications of the same or different composition to form that layer. For example, where the first coating layer is a basecoat layer it is contemplated at one, two, or more basecoat applications may be used together to form the "first coating layer." Similarly, a clearcoat can be contemplated to have one, two or more clearcoat applications to form the "second coating layer".

As used in this specification, the terms "polymer" and "polymeric" means prepolymers, oligomers, and both homopolymers and copolymers. As used in this specification, "prepolymer" means a polymer precursor capable of further reactions or polymerization by one or more reactive groups to form a higher molecular mass or cross-linked state.

As used in this specification, the prefix "poly" refers to two or more. For example, a "polyfunctional" molecule (whether a polymer, monomer, or other compound) comprises two or more reactive functional groups such as hydroxyl groups, amine groups, mercapto groups, carbamate groups, and the like. More specifically, "polyol" means a compound comprising two or more hydroxyl groups, "polyamine" means a compound comprising two or more amine groups, "polythiol" means a compound comprising two or more mercapto groups, and "polycarbamate" means a compound comprising two or more carbamate groups.

A polyfunctional compound such as a polyol, polyamine, polythiol, or polycarbamate may be a polymer, but does not have to be a polymer, and may comprise, for example, non-polymeric compounds. A polymeric polyol, polymeric polyamine, polymeric polythiol, or polymeric polycarbamate respectively comprises two or more pendant and/or terminal hydroxyl, amine, mercapto, or carbamate functional groups on the polymer molecules. A "pendant group" refers to a group that comprises an offshoot from the side of a polymer backbone and which does not comprise part of the polymer backbone, whereas "terminal group" refers to a group on an end of a polymer backbone and which comprises part of the polymer backbone.

Additionally, the terms polyol, polyamine, polythiol, and polycarbamate may encompass compounds comprising combinations of different types of functional groups. For example, a compound comprising two or more hydroxyl groups and two or more carbamate groups may be referred to as a polyol, a polycarbamate, or a polyol/polycarbamate. Furthermore, polyol, polyamine, polythiol, and polycarbamate compounds may comprise either or both the neutral functional groups (hydroxyl, amine, mercapto, or carbamate) and/or a salt of an ionized form of the functional group (e.g., alkoxide salts, ammonium salts, and the like).

As used in this specification, the term "1,1-di-activated vinyl compound" means a compound comprising a vinyl group having two electron withdrawing groups (EWG) covalently bonded to one of the π-bonded carbons and no substituents covalently bonded to the other π-bonded carbon (i.e., -EWG-C(=CH$_2$)-EWG-), wherein the electron withdrawing groups independently comprise halogen groups, haloalkyl groups, carbonyl-containing groups (e.g., esters, amides, aldehydes, ketones, acyl halides, carboxylic/carboxylate groups), cyano groups, sulfonate groups, ammonium groups, quaternary amine groups, or nitro groups. The term "multifunctional form" means a compound comprising two or more 1,1-di-activated vinyl groups covalently bonded in one molecule. For instance, a dialkyl methylene malonate is an example of a 1,1-di-activated vinyl compound, and a transesterification adduct of a dialkyl methylene malonate and a polyol is an example of a multifunctional form of a dialkyl methylene malonate.

The invention described in this specification includes crosslinker compositions and coating compositions comprising the crosslinker compositions. The crosslinker compositions comprise a polyisocyanate compound and a 1,1-di-activated vinyl compound, or a multifunctional form thereof, or a combination thereof. The coating compositions described in this specification comprise a resin component and the crosslinker composition. The resin component comprises a polyfunctional polymer comprising two or more pendant and/or terminal active hydrogen-containing groups. In this context, active hydrogen-containing groups can be functional groups capable of giving a proton in a chemical reaction. Examples of active hydrogen-containing groups include, but are limited to, hydroxyl (or alcohol), thiol, carboxylic acid, amines and 1-alkynes; and/or their corresponding polyermic forms. For example, the resin component can comprise a polymeric polyol resin, a polymeric polyamine resin, a polymeric polythiol resin, or a polymeric polycarbamate resin, or a combination of any thereof. The crosslinker composition reacts with the resin component when mixed together, thereby curing the coating composition. For example, a mixture of a polyol resin and the crosslinker composition forms a polyurethane coating composition. Similarly, a mixture of a polyamine resin and the crosslinker composition forms a polyurea coating composition.

The 1,1-di-activated vinyl compounds can comprise methylene dicarbonyl compounds, dihalo vinyl compounds, dihaloalkyl disubstituted vinyl compounds, or cyanoacrylate compounds, or multifunctional forms of any thereof, or combinations of any thereof. Examples of 1,1-di-activated vinyl compounds and multifunctional forms thereof that can be used in the crosslinker and coating compositions are described in U.S. Pat. Nos. 8,609,885; 8,884,051; 9,108,914; 9,181,365; and 9,221,739, which are incorporated by reference into this specification. Additional examples of 1,1-di-activated vinyl compounds and multifunctional forms thereof that can be used in the crosslinker and coating compositions are described in U.S. Publication Nos. 2014/0288230; 2014/0329980; and 2016/0068618, which are incorporated by reference into this specification.

The crosslinker and coating compositions can comprise a 1,1-di-activated vinyl compound comprising a methylene malonate. Methylene malonates are compounds having the general formula (I):

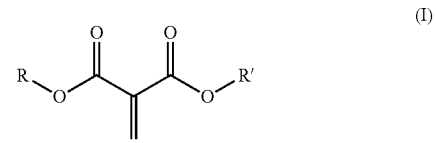

wherein R and R' may be the same or different and may represent nearly any substituent or side-chain, such as substituted or unsubstituted alkyl or aryl groups. For example, the crosslinker and coating compositions can comprise a dialkyl methylene malonate, a diaryl methylene malonate, a multifunctional form of a dialkyl methylene malonate, or a multifunctional form of a diaryl methylene malonate, or a combination of any thereof.

A multifunctional form of a methylene malonate can comprise a transesterification adduct of the methylene malonate and a polyol. A multifunctional form of a methylene malonate can thus have the general formula (II):

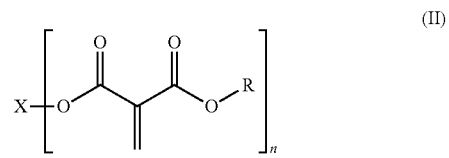

wherein n is greater than one, X is a polyol residue and each R may be the same or different, as described above. As used herein the term "residue" refers to a group derived from the respective compound. For instance, in the above formula, X is an n-valent group derived from a polyol by a transesterification reaction involving methylene malonate and n hydroxyl groups of said polyol. Likewise, a polymer comprising residues of a certain compound is obtained from polymerizing said compound. In some examples, a multifunctional form of a methylene malonate can comprise a transesterification adduct of the methylene malonate and a diol, and thus have the general formula (III):

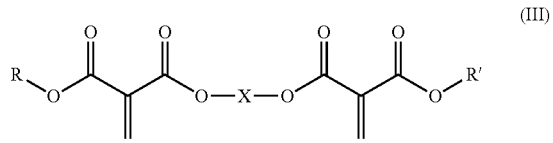

wherein X is a diol residue and R and R' may be the same or different, as described above.

Polyols that are suitable for the production of a transesterification adduct with a methylene malonate include, for example, polymeric polyols (such as polyether polyols, polyester polyols, acrylic polyols, and polycarbonate polyols) and monomeric polyols (such as alkane polyols, including alkane diols such as 1,5-pentanediol and 1,6-hexanediol). The transesterification adduct can be formed by the reaction of a methylene malonate and a polyol, in the presence of a catalyst, in a suitable reaction medium. Examples of transesterification adducts of methylene malonates and polyols that may be used in the coating compositions are described in U.S. Publication No. 2014/0329980 and U.S. Pat. No. 9,416,091, which are incorporated by reference herein. Further, the concentration of the transesterification adduct can be influenced by ratio of the reactants and/or distillation or evaporation of the reaction medium.

In some examples, the crosslinker and coating compositions can comprise dimethyl methylene malonate (D3M), a multifunctional form of D3M, or both. In some examples, the coating compositions can comprise diethyl methylene malonate (DEMM), a multifunctional form of DEMM, or both. The multifunctional forms of D3M or DEMM can comprise transesterification adducts of D3M or DEMM and a polyol, such as, for example, 1,5-pentanediol or 1,6-hexanediol.

In some examples, the crosslinker and coating compositions can comprise a combination of a dialkyl methylene malonate and a multifunctional form of a dialkyl methylene malonate. The crosslinker and coating compositions can comprise, for example, DEMM and a multifunctional form of DEMM comprising a transesterification adduct of DEMM and at least one polyol. The DEMM can be transesterified with polyol comprising, for example, an alkane diol such as 1,5-pentanediol or 1,6-hexanediol and include, for example, transesterification adducts of D3M and 1,5-pentanediol and/or 1,6-hexanediol as well as transesterification adducts of DEMM and 1,5-pentanediol and/or 1,6-hexanediol.

The 1,1-di-activated vinyl compound, or a multifunctional form thereof, or a combination thereof may be present in the crosslinker compositions in an amount of 1.0-50.0% by total weight of the crosslinker composition, or any sub-range subsumed therein, such as, for example, 5.0-20.0%, 12.0-18.0%, 13.0-17.0%, or 14.0-17.0%. The 1,1-di-activated vinyl compound, or a multifunctional form thereof, or a combination thereof may be present in the coating compositions (which comprise the crosslinker compositions) in an amount of 1.0-50.0% by total weight of the coating composition, or any sub-range subsumed therein, such as, for example, 1.0-10.0%, 2.0-9.0%, 3.0-8.0%, or 4.0-7.0%.

The crosslinker and coating compositions can comprise polyisocyanate compounds such as, for example, aliphatic polyisocyanates, cycloaliphatic polyisocyanates, araliphatic polyisocyanates, or aromatic polyisocyanates, or a combination of any thereof. In some examples, the polyisocyanate compounds comprise aliphatic polyisocyanates and/or cycloaliphatic polyisocyanates.

Examples of suitable aliphatic and cycloaliphatic polyisocyanates include 4,4'-methylenedicyclohexyl diisocyanate (hydrogenated MDI), hexamethylene diisocyanate (HDI), isophorone diisocyanate (IPDI), methylenebis(cyclohexyl isocyanate), trimethyl hexamethylene diisocyanate (TMDI), meta-tetramethylxylylene diisocyanate (TMXDI), and cyclohexylene diisocyanate (hydrogenated XDI).

Examples of suitable aromatic polyisocyanates include toluene diisocyanate (TDI) (i.e., 2,4-tolylene diisocyanate, 2,6-tolylene diisocyanate, or a mixture thereof), diphenylmethane-4,4'-diisocyanate (MDI), naphthalene-1,5-diisocyanate (NDI), 3,3'-dimethyl-4,4'-biphenylene diisocyanate (TODI), crude TDI (i.e., a mixture of TDI and an oligomer thereof), polymethylenepolyphenyl polyisocyanate, crude MDI (i.e., a mixture of MDI and an oligomer thereof), xylylene diisocyanate (XDI), and phenylene diisocyanate.

The crosslinker and coating compositions can comprise diisocyanate compounds and/or polyisocyanate compounds comprising diisocyanate reaction products (such as, for example, reaction products of the diisocyanates described above) comprising urethane groups, urea groups, uretdione groups, uretonimine groups, isocyanurate groups, iminooxadiazine dione groups, oxadiazine trione groups, carbodiimide groups, acyl urea groups, biuret groups, and/or allophanate groups. Examples of such diisocyanate reaction products include diisocyanate adducts and diisocyanate oligomers. In some examples, the crosslinker and coating compositions can comprise a polyisocyanate component comprising at least one of HDI, IPDI, or hydrogenated MDI, or adducts or oligomers of HDI, IPDI, or hydrogenated MDI, or combinations of any thereof.

In some examples, the crosslinker and coating compositions comprise an at least partially blocked polyisocyanate compound. As used in this specification, the term "at least partially blocked polyisocyanate" means a polyisocyanate where at least a portion of the isocyanate (—NCO) groups have been reacted with another compound so that the resultant capped isocyanate portion is stable to hydroxyl and amine groups at room temperature but reactive with hydroxyl or amine groups at elevated temperature, usually 100° C. or higher. A "partially blocked polyisocyanate" can contain an average of about one free reactive isocyanate group per molecule, whereas a "fully blocked polyisocyanate" will contain no free reactive isocyanate groups per molecule. Any of the diisocyanates or other polyisocyanates described above (or any combination thereof) can be used in a partially blocked or completely blocked form in the crosslinker and coating compositions described in this specification.

In some examples, an at least partially blocked polyisocyanate present in the crosslinker and coating compositions of the present invention comprises a urethane-containing material having a moiety of the formula (IV):

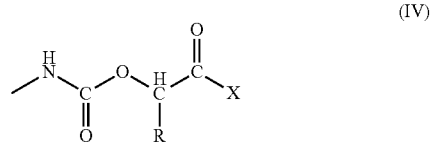

(IV)

wherein R is H, an alkyl, alkenyl, or aryl group, and X is H, an alkyl, alkenyl, an aryl group, or —N(R$_1$)(R$_2$), wherein R$_1$ and R$_2$ are, each independently, H, an alkyl, an alkenyl, or an aryl group. Such urethane-containing blocked polyisocyanates, and methods for their production, are described in U.S. Pat. No. 4,452,963 at column 1, line 47 to column 5, line 13, which is incorporated by reference into this specification. In some examples, such urethane-containing blocked polyisocyanates are prepared by reacting a polyisocyanate compound with another compound having the formula (V):

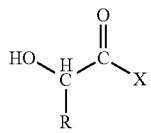

(V)

wherein R is H, an alkyl, alkenyl, or aryl group, and X is H, an alkyl, alkenyl, an aryl group, or —N($R_1$)($R_2$), wherein $R_1$ and $R_2$ are, each independently, H, an alkyl, an alkenyl, or an aryl group.

Other at least partially blocked polyisocyanates, which are suitable for use in the crosslinker and coating compositions of present invention, include: (i) the blocked polyisocyanates such as those described in U.S. Pat. No. 6,017,432 at column 2, lines 43-64 and column 6, line 33 to column 8, line 38 (incorporated by reference); (ii) ketoxime-blocked polyisocyanates, such as those described for example in U.S. Pat. No. 3,694,389 at column 2, line 24 to column 6, line 29 (incorporated by reference); (iii) dialkyl malonate-blocked polyisocyanates, such as those described in U.S. Pat. No. 4,373,081 (incorporated by reference); and (iv) 3,5-dimethylpyrazole blocked polyisocyanates.

As described above, the coating compositions can comprise a polyol resin, a polyamine resin, a polythiol resin, or a polycarbamate resin, or a combination of any thereof. While not intending to be bound by any theory, it is believed that the vinyl group(s) in the 1,1-di-activated vinyl compounds and/or the multifunctional forms thereof in the crosslinker composition can self-polymerize and/or react via a Michael addition mechanism with the hydroxyl, amine, mercapto, and/or carbamate groups in polyol, polyamine, polythiol, and/or polycarbamate resins (i.e., polyfunctional polymeric resins), and thereby form stable covalent linkages. Additionally, the 1,1-di-activated vinyl compounds and/or the multifunctional forms thereof that undergo self-polymerization reactions may covalently bond to polyfunctional polymeric resins through the linkages formed by the Michael addition reactions with the hydroxyl, amine, mercapto, and/or carbamate groups.

The 1,1-di-activated vinyl compounds and/or the multifunctional forms thereof present in the crosslinker compositions can therefore function as secondary crosslinking/curing agents for polyfunctional polymeric resins, in addition to the polyisocyanate compounds, and provide a multiple-cure mechanism. Accordingly, in addition to the crosslinking/curing reactions between the polyisocyanate compounds and the reactive groups on the polyfunctional polymeric resins (e.g., hydroxyl, amine, mercapto, and/or carbamate groups), the 1,1-di-activated vinyl compounds and/or the multifunctional forms thereof present in the crosslinker compositions can provide other crosslinking/curing reactions comprising one or both of polymerization reactions and Michael addition reactions that further crosslink and cure the polyfunctional polymeric resins.

Polyfunctional polymeric resins that can be formulated in the coating compositions and crosslinked and cured with polyisocyanates and 1,1-di-activated vinyl compounds and/or the multifunctional forms thereof include polymeric resins comprising pendant and/or terminal hydroxyl, amine, mercapto, and/or carbamate groups, such as, for example, polyether polyols, polyester polyols, acrylic polyols, polycarbonate polyols, polyether polyamines, polyester polyamines, acrylic polyamines, polycarbonate polyamines, polyether polythiols, polyester polythiols, acrylic polythiols, polycarbonate polythiols, polyether polycarbamates, polyester polycarbamates, acrylic polycarbamates, polycarbonate polycarbamates, and combinations of any thereof. Additional polyfunctional polymeric resins that can be formulated in the coating compositions and crosslinked and cured with polyisocyanates and 1,1-di-activated vinyl compounds and/or the multifunctional forms thereof include any polyfunctional polymeric resins that incorporate hydroxyl, amine, mercapto, or carbamate groups, or combinations of any thereof, including for example, polyester resins, polyurethane resins, polyurea resins, polyether resins, polythioether resins, polycarbonate resins, polycarbamate resins, epoxy resins, phenolic resins, and aminoplast resins (urea-formaldehyde and/or melamine-formaldehyde).

In addition to polyfunctional polymeric resins, polyfunctional monomeric compounds can be formulated in the coating compositions and crosslinked and cured with polyisocyanates and 1,1-di-activated vinyl compounds and/or the multifunctional forms thereof. Examples of monomeric polyol compounds include, but are not necessarily limited to, glycols such as ethylene glycol, diethylene glycol, triethylene glycol, 1,2-propylene glycol, 1,3-butylene glycol, tetramethylene glycol, hexamethylene glycol, neopentyl glycol, pentaerythritol, and combinations of any thereof. Other suitable hydroxyl-containing polyfunctional monomeric compounds include, but are not limited to, 1,5-pentandiol, 1,6-hexanediol, cyclohexanedimethanol, 2-ethyl-1,6-hexanediol, 1,4-butanediol, 1,3-propanediol, trimethylol propane, 1,2,6-hexanetriol, glycerol, and combinations of any thereof. Additionally, monomeric amino alcohols that can be formulated in the coating compositions and crosslinked and cured with polyisocyanates and 1,1-di-activated vinyl compounds and/or the multifunctional forms thereof include, but are not limited to, ethanolamine, propanolamine, butanolamine, and combinations of any thereof.

Examples of monomeric polyamine compounds that can be formulated in the coating compositions and crosslinked and cured with polyisocyanates and 1,1-di-activated vinyl compounds and/or the multifunctional forms thereof include, for example, diamines such as, for example, ethylenediamine, hexamethylenediamine, 1,2-propanediamine, 2-methyl-1,5-penta-methylenediamine, 2,2,4-trimethyl-1,6-hexanediamine, isophoronediamine, diaminocyclohexane, xylylenediamine, 1,12-diamino-4,9-dioxadodecane, and combinations of any thereof. Other suitable monomeric and polymeric polyamine compounds include polyetheramines such as the Jeffamine® products available from Huntsman Chemical Company.

Examples of monomeric and polymeric polythiol compounds that can be formulated in the coating compositions and crosslinked and cured with polyisocyanates and 1,1-di-activated vinyl compounds and/or the multifunctional forms thereof include, for example, resins and compounds produced by the esterification of a polyol with a mercapto organic acid. Examples of suitable polyols include the polyols described above, and examples of suitable mercapto organic acids include thioglycolic acid and mercaptopropionic acid. Examples of monomeric polythiol compounds include, but are not limited to, glyceryl dithioglycolate, glyceryl trithioglycolate, glycol dimercaptoacetate, pentaerythritol tetramercaptoacetate, glycol di-(3-mercaptopropionate), pentaerythritol tetra(3-mercaptoproprionate), dipentaerythritol hexa(3-mercaptopropionate), trimethylolpropane tris-(thioglycolate), pentaerythritol tetrakis-(thioglycolate), ethyleneglycol dithioglycolate, trimethylolpropane tris-(β-thiopropionate), pentaerythritol tetrakis-(β-thiopropionate), dipentaerythritol poly(β-thiopropionate)

and combinations of any thereof. Other suitable monomeric and polymeric polythiol compounds include the Thiocure® products available from Bruno Bock Chemische Fabrik GmbH & Co. KG.

Examples of monomeric and polymeric polycarbamate compounds that can be formulated in the coating compositions and crosslinked and cured with polyisocyanates and 1,1-di-activated vinyl compounds and/or the multifunctional forms thereof include, for example, resins and compounds produced by the transcarbamylation of a polyol with an alkyl carbamate (i.e., the transesterification of the alkyl carbamate with the polyol).

In addition to (1) the polyol, polyamine, polythiol, or polycarbamate, or combinations of any thereof, and (2) the 1,1-di-activated vinyl compound, or multifunctional form thereof, or combination thereof, the curable compositions can further comprise an acid promoter. In some examples, the acid promoter can comprise a strong acid. As used in this specification, the term "strong acid" means an acid having a pKa in water at 25° C. of less than −1.3 and, for protic acids, at least one proton (H+) that completely dissociates in aqueous solution. Strong acid promoters that can be formulated in the curable compositions include, for example, inorganic strong acids and organic strong acids. Suitable inorganic strong acids include, for example, mineral acids (e.g., hydrochloric acid, perchloric acid, sulfuric acid, and nitric acid) and heteropoly acids (e.g., phosphotungstic acid, phosphomolybdic acid, silicotungstic acid, and silicomolybdic acid). Suitable organic strong acids include, for example, sulfonic acids (e.g., p-toluenesulfonic acid, methanesulfonic acid, and dodecylbenzenesulfonic acid). Combinations of any strong acids (e.g., a mixture of a sulfonic acid and a heteropoly acid) may also be formulated in the coating compositions.

Without intending to be bound by any theory, it is believed that acids may function as Lewis acids in the coating compositions and complex to the 1,3-dicarbonyl motif, thereby promoting a Michael addition reaction between the functional groups on the polyfunctional resin components and the vinyl groups on the 1,1-di-activated vinyl compound and/or multifunctional form thereof. Accordingly, a strong acid component in a coating composition may shift the crosslinking and curing reactions away from self-polymerization of the 1,1-di-activated vinyl compound and/or multifunctional form thereof and toward Michael addition reactions forming covalent linkages between the polyfunctional components and the 1,1-di-activated vinyl compound and/or multifunctional form thereof.

In addition to (A) the polyfunctional polymeric resins, and (B) the crosslinker composition, the coating compositions can further comprise an activator. As used in this specification, the term "activator" means a compound or other agent capable of initiating and/or catalyzing (i) polymerization of 1,1-di-activated vinyl compounds or multifunctional forms thereof and/or (ii) addition reactions between 1,1-di-activated vinyl compounds or multifunctional forms thereof and polyfunctional components (e.g., polyol, polyamine, polythiol, and/or polycarbamate resins or compounds). The term "activator" includes (1) active forms of activator compounds and (2) latent precursor forms of activator compounds that are capable of conversion from the latent precursor form into the active form (e.g., by exposure to an effective amount of heat, electromagnetic radiation, pressure, or a chemical co-activator). Additionally, latent precursor forms of activator compounds that are capable of conversion into the active form include activators associated with a volatile or otherwise removable neutralizing agent or inhibitor compound that can evaporate or otherwise be removed from the coating composition when applied as a coating layer, thereby activating the activator.

The activator can comprise a base. As used in this specification, the term "base" means an electronegative compound or functional group capable of initiating the anionic polymerization of a 1,1-di-activated vinyl compound. Suitable activators include organic bases (e.g., amine-containing compounds and carboxylate salts), inorganic bases (e.g., hydroxide salts and carbonate salts), organometallic compounds, and combinations of any thereof. Suitable activators also include polymers comprising pendant and/or terminal amine, carboxylate salt, or other base functionality capable of initiating the anionic polymerization of a 1,1-di-activated vinyl compound.

In some examples, the activator comprises a strong base (pH over 9), a moderate base (pH from 8-9), or a weak base (pH from over 7 to 8), or a combination of any thereof. The activator may comprise, for example, sodium acetate; potassium acetate; acid salts of sodium, potassium, lithium, copper, or cobalt; tetrabutyl ammonium fluoride, chloride, or hydroxide; an amine, including primary, secondary, and tertiary amines; an amide; salts of polymer bound acids; benzoate salts; 2,4-pentanedionate salts; sorbate salts; propionate salts; secondary aliphatic amines; piperidine, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; 1,4-diazabicyclo[2.2.2]octane (DABCO); 1,1'-iminobis-2-propanol (DIPA); 1,2-cyclohexaneamine; 1,3-cyclohexandimethanamine; 2-methylpentamethylenediamine; 3,3-iminodipropylamine; triacetone diamine (TAD); salts of amines with organic monocarboxylic acids; piperidine acetate; metal salt of a lower monocarboxylic acid; copper(II) acetate, cupric acetate monohydrate, zinc acetate, zinc chloracetate, magnesium chloracetate, magnesium acetate; salts of acid containing polymers; salts of polyacrylic acid co-polymers; and combinations of any thereof.

In some examples, the coating compositions can comprise a tertiary amine activator such as, for example, DABCO; 2-(dimethylamino)ethanol (DMAE/DMEA); 2-piperazin-l-ylethylamine; N,N,N',N'-tetrakis(2-hydroxypropyl)ethylenediamine; 2-[2-(dimethylamino)ethoxy]ethanol; 1-[bis[3-(dimethylamino)propyl]amino]-2-propanol; N,N,N',N'',N''-pentamethyldiethylenetriamine; N,N,N',N'-tetraethyl-1,3-propanediamine; N,N,N',N'-tetramethyl-1,4-butanediamine; N,N,N',N'-tetramethyl-1,6-hexanediamine; 1,4,8,11-tetramethyl-1,4,8,11-tetraazacyclotetradecane; 1,3,5-trimethylhexahydro-1,3,5-triazine; methyl dicocoamine; 1,8-diazabicycloundec-7-ene (DBU); 1,5-diazabicyclo-[4,3,0]-non-5-ene (DBN); 1,1,3,3-tetramethylguanidine; or combinations of any thereof.

In some examples, the coating compositions can comprise an activator in amounts, based on total composition weight, ranging from a non-zero amount (i.e., >0%) up to 10%, up to 5%, up to 2%, up to 1%, up to 0.5%, or up to 0.1%, or any sub-range subsumed within such ranges. The activators may be maintained separate from the 1,1-di-activated vinyl compounds or multifunctional forms thereof (e.g., in separate container) until a time sufficiently close to the application of the coating composition over a substrate in order to prevent premature curing of the coating composition. The activator may then be mixed with all of the other components of the coating composition and applied over a substrate using a suitable application technique (e.g., spraying, electrostatic spraying, dipping, rolling, brushing, electrocoating, and the like). For example, the activator can be stored in a container with the polyfunctional resin component (A), and the crosslinker component (B) stored in a separate container until a time sufficiently close to the application of the coating composition over a substrate in order to prevent premature curing of the coating composition.

In other examples, described below, activators may be applied over and/or under layers of the coating compositions to (1) activate addition reactions between the polyfunctional resin components and the 1,1-di-activated vinyl compounds or multifunctional forms thereof, and/or (2) activate polymerization reactions among the 1,1-di-activated vinyl compounds or multifunctional forms thereof.

Additional examples of activators and activation methods that can be used in the present coating compositions are described in U.S. Pat. No. 9,181,365, which is incorporated by reference into this specification.

In some examples, the coating compositions can comprise (A) the polyfunctional polymeric resin, (B) the crosslinker composition, and (C) both an acid promoter and an activator, as described above. In addition to (A) the polyfunctional polymeric resin, (B) the crosslinker composition, and (C) any promoter and/or activator (e.g., an acid and/or base), if present, the coating compositions can further comprise additional materials such as additional resins, solvents, reactive diluents, colorants, and the like. As used herein, "colorant" means any substance that imparts color and/or other opacity and/or other visual effect to the coating composition, particularly when applied over a substrate and cured. A colorant can be added to the coating composition in any suitable form, such as discrete particles, dispersions, solutions, and/or flakes. A single colorant or a mixture of two or more colorants can be used in the coatings compositions described in this specification.

Example colorants include pigments (organic or inorganic), dyes, and tints, such as those used in the paint industry and/or listed by the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coating by use of a grind vehicle, such as an acrylic grind vehicle, the use of which will be familiar to persons skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures of any thereof. The terms "pigment" and "colored filler" can be used interchangeably. Example dyes include, but are not limited to, those that are solvent and/or aqueous based such as phthalo green or blue, iron oxide, bismuth vanadate, anthraquinone, perylene, and quinacridone.

Example tints include, but are not limited to, pigments dispersed in water-based or water miscible carriers such as AQUA-CHEM 896 (available from Degussa, Inc.), and CHARISMA COLORANTS and MAXITONER INDUSTRIAL COLORANTS (available from the Accurate Dispersions Division of Eastman Chemical Company).

A colorant optionally formulated in the coating compositions can also comprise a special effect composition or pigment. As used herein, a "special effect composition or pigment" means a composition or pigment that interacts with visible light to provide an appearance effect other than, or in addition to, a continuous unchanging color.

Example special effect compositions and pigments include those that produce one or more appearance effects such as reflectance, pearlescence, metallic sheen, texture, phosphorescence, fluorescence, photochromism, photosensitivity, thermochromism, goniochromism, and/or color-change. Examples of special effect compositions can include transparent coated mica and/or synthetic mica, coated silica, coated alumina, aluminum flakes, a transparent liquid crystal pigment, a liquid crystal coating, and combinations of any thereof.

Other examples of materials that can be formulated in the coating compositions include plasticizers, abrasion resistant particles, anti-oxidants, hindered amine light stabilizers, UV light absorbers and stabilizers, surfactants, flow and surface control agents, thixotropic agents, solvents and co-solvents, reactive diluents, catalysts, reaction inhibitors, and other customary auxiliaries in the paint and coating industry.

The invention described in this specification includes the use of the coating compositions described above. For example, a process for coating a substrate can comprise applying a first coating layer over at least a portion of a substrate, applying a second coating layer over at least a portion of the first coating layer, and curing the first coating layer and/or the second coating layer. The curing of the first coating layer and the second coating layer can be performed sequentially or simultaneously with or without intermediate flashing, drying, or dehydrating steps. The second coating layer comprises the coating composition described above, e.g., comprising (A) a polyfunctional polymeric resin (e.g., a polyol resin) and (B) a crosslinker composition comprising (1)1) a polyisocyanate and (b2) a 1,1-di-activated vinyl compound, or a multifunctional form thereof, or a combination thereof.

The coating composition is applied as the second coating layer over a first coating layer, and can comprise, in any combination, any of the features or characteristics described above. For example, the 1,1-di-activated vinyl compound can comprise a methylene dicarbonyl compound, a dihalo vinyl compound, a dihaloalkyl disubstituted vinyl compound, or a cyanoacrylate compound, or a multifunctional form of any thereof, or a combination of any thereof. The polyfunctional polymeric resin can comprise a polyol resin, a polyamine resin, a polythiol resin, or a polycarbamate resin, or a combination of any thereof. The coating composition can include a promoter (e.g., a strong acid such as a sulfonic acid and/or a heteropoly acid) and/or an activator (e.g., an amine such as a tertiary amine like DABCO or DMAE/DMEA).

As described above, the curable composition is not necessarily limited to the sole use of an acid promotor or an activator or an extender. In some examples, a combination of both an acid promoter and an activator compound can be used in a curable composition. Similarly, a combination of an acid promoter and an extender, or a combination of an activator compound and an extender, or a combination of all three, can be used in a coating composition. Without intending to be bound by any theory, the presence of an acid promoter, an activator compound, and/or an extender in a curable composition can influence the final coating properties by modulating the cure kinetics and/or the extent of Michael addition reactions versus self-polymerization of the 1,1-di-activated vinyl compound and/or multifunctional form thereof. In some examples, the acid catalyst can comprise a "strong acid" as described above and/or weaker acids. Suitable weaker acids that can be formulated in the coating compositions include, for example, inorganic weak acids and organic weak acids. In this context, weak acids are defined as having pKa in the range of −1.3 to 7 in water at 25° C. Suitable inorganic weak acids include, for example, sulfamic acid, phosphoric acid, hypochlorous acid, and boric acid. Suitable organic weak acids include, for example, carboxylic acids such as oxalic acid, acetic acid, propionic acid, octanoic, stearic acid, isostearic acid, benzoic acid, and citric acid.

As used in this specification, the terms "cure" and "curing" refer to the chemical crosslinking of components in a coating composition applied as a coating layer over a substrate. Accordingly, the terms "cure" and "curing" do not encompass solely physical drying of coating compositions through solvent or carrier evaporation. In this regard, the term "cured," as used in this specification, refers to the condition of a coating layer in which at least one of the components of the coating composition forming the layer has chemically reacted to form new covalent bonds in the coating layer.

In some examples, the curing of the second coating layer can comprise spraying an activator solution over and/or under at least a portion of the second coating layer. The activator solution can comprise an activator (as described above) dissolved or otherwise dispersed in a liquid carrier. The activator solution can comprise an activator compound such as amine activator (e.g., a tertiary amine compound such as DABCO or DMAE/DMEA) dissolved in an aqueous or organic solvent (e.g., an ester solvent such as n-butyl acetate). The activator solution can be sprayed or otherwise applied over the first coating layer and the coating composition applied over the pre-applied activator solution and the first coating layer. Alternatively, or in addition, the activator solution can be sprayed or otherwise applied over a pre-applied layer or film of the coating composition (i.e., the second coating layer). The activator solution may initiate Michael addition reactions and/or polymerization reactions at the interface of the applied coating composition layer or film and may migrate into the layer or film to further initiate curing reactions.

In some examples, the curing of the second coating layer may be initiated by activator compounds present in the first coating layer. For instance, the first coating layer may comprise an activator compound, and the curing of the second coating layer comprises activating an addition reaction and/or a polymerization reaction in the second coating layer with the activator compound in the first coating layer. In this manner, the activator compound in the first coating layer may initiate Michael addition reactions and/or polymerization reactions in the second coating layer at the interface between the two layers. The activator compound in the first coating layer may also migrate through the interface and into the second coating layer to further initiate curing reactions. In this example, the chemical composition of the first coating layer may be such that the activator does not function to initiate crosslinking or other curing reactions in the first coating layer, but does so initiate curing reaction in the second coating layer upon application of the second coating layer over and in direct contact with the first coating layer. The activator present in the first coating layer which initiates crosslinking or other curing reactions in the second coating layer can comprise an activator compound such as amine activator (e.g., a tertiary amine compound such as DABCO or DMAE/DMEA).

In some examples, the first coating layer and the second coating layer can be applied over at least a portion of a bare substrate or a pre-applied coating (e.g., a primer coating) using application techniques such as spraying, electrostatic spraying, dipping, rolling, brushing, electrocoating, and the like. Once applied, the first coating layer and the second coating layer can be dehydrated and/or cured. As described above, the curing of the first coating layer and the second coating layer can be performed sequentially (i.e., the first coating layer is cured before the application of the second coating layer) or simultaneously with or without intermediate flashing, drying, or dehydrating steps. For example, the first coating layer can be applied and dehydrated, the second coating layer can be applied over the dehydrated first coating layer, and both the first and second coating layers baked or otherwise treated to cure the multi-layer system. The specific curing conditions of the coating layers will be based, at least in part, on the chemical formulation of the coating composition forming the layers. In some examples, the first coating layer and/or the second coating layer can be dehydrated and/or cured, independently or together, at temperatures ranging from ambient temperature (about 20° C. to 25° C.) to 500° C., or any sub-range subsumed therein, for example, from ambient temperatures to 200° C., from ambient temperatures to 150° C., from ambient temperatures to 140° C., from ambient temperatures to 130° C., from ambient temperatures to 120° C., from ambient temperatures to 100° C., from ambient temperatures to 90° C., from ambient temperatures to 80° C., from ambient temperatures to 60° C., or from ambient temperatures to 50° C.

As described above, in addition to the polyisocyanate compounds, the 1,1-di-activated vinyl compounds and/or multifunctional forms thereof can function as crosslinking/curing agents for polyfunctional polymeric resins. Again, not intending to be bound by any theory, it is believed that the vinyl group(s) in the 1,1-di-activated vinyl compounds and/or the multifunctional forms thereof can react via self-polymerization and/or a Michael addition mechanism with the hydroxyl, amine, mercapto, and/or carbamate groups in the polyfunctional polymeric resins and thereby form stable covalent linkages. Accordingly, after curing, the cured second coating layer may comprise (1) a reaction product of the crosslinking reactions between the polyfunctional polymeric resin (e.g., a polyol resin and/or a polyamine resin) and the polyisocyanate (e.g., a urethane-containing and/or urea-containing reaction product), and (2) one or more of (2a) a polymerization reaction product of the 1,1-di-activated vinyl compound, or a multifunctional form thereof, or a combination thereof, and/or (2b) an addition reaction product of (i) the polyfunctional polymeric resin and (ii) a 1,1-di-activated vinyl compound and/or a multifunctional forms thereof. The 1,1-di-activated vinyl compound and/or a multifunctional forms thereof may comprise a dialkyl methylene malonate, a diaryl methylene malonate, a multifunctional form of a dialkyl methylene malonate, or a multifunctional form of a diaryl methylene malonate, or a combination of any thereof.

The "Addition Reaction product" refers to the adduct formed by the reaction of 1,1'-di-activated vinyl compound and/or multifunctional form thereof with a nucleophile (such as an amine, thiol or alcohol and/or their polymeric form). Without being bound to any theory, this may be the result of an addition of the nucleophile to the conjugate double bond (the Michael Addition Reaction'), or displacing the alcohol of the ester of a 1,1-diactivated vinyl ester with a another alcohol (a trans-esterification reaction), an amine, a thiol and/or a polymeric form of them. For example, the reaction of an amine can result in an amide product and the reaction with a thiol can result in a thioester product. A "polymeric addition product" refers to the product of polymerization reaction, wherein a multitude of reactants react repetitively. Without being bound by any theory, this could be done through a variety of reaction mechanisms, such as anionic polymerization, condensation polymerization, chain growth or radical polymerization. For example, a primary amine can react 1,1'-diethyl methylene malonate (DEMM) via anionic polymerization to form polymeric-DEMM.

In some examples, after curing, the cured second coating layer may comprise (1) a reaction product of the crosslinking reactions between the polyfunctional polymeric resin (e.g., a polyol resin and/or a polyamine resin) and the polyisocyanate (e.g., a urethane-containing and/or urea-containing reaction product), and (2) one or more of (2a) a polymerization reaction product of the 1,1-di-activated vinyl compound, or a multifunctional form thereof, or a combination thereof, and/or (2b) an addition reaction product of (i) the polyfunctional polymeric resin and (ii) diethyl methylene malonate and a multifunctional form of diethyl methylene malonate. The multifunctional form of the diethyl methylene malonate may comprise a transesterification adduct of diethyl methylene malonate and at least one polyol. The transesterification adduct of the diethyl methylene malonate and the at least one polyol may comprise a transesterification adduct of the diethyl methylene malonate and a diol (e.g., an alkane diol such as 1,5-pentanediol or 1,6-hexanediol).

The invention described in this specification includes coatings formed from the coating compositions described above. For example, a multi-layer coating can comprise a first coating layer applied over at least a portion of a substrate, and a second coating layer applied over at least a portion of the first coating layer. The second coating layer can comprise (1) a reaction product of the crosslinking reactions between the polyfunctional polymeric resin (e.g., a polyol resin and/or a polyamine resin) and the polyisocyanate (e.g., a urethane-containing and/or urea-containing reaction product), and (2) one or more of (2a) a polymerization reaction product of the 1,1-di-activated vinyl compound, or a multifunctional form thereof, or a combination thereof, and/or (2b) an addition reaction product of (i) the polyfunctional polymeric resin and (ii) a 1,1-di-activated vinyl compound, or a multifunctional form thereof, or a combination thereof.

The first coating layer can be formed from a coating composition comprising any useful formulation. For example, coating compositions than can be used to produce the first coating layer of a multi-layer coating include, for example, polyurethane-based coating compositions, polyurea-based coating compositions, acrylic-based coating compositions, epoxy-based coating compositions, polyester-based coating compositions, polyether-based coating compositions, polythioether-based coating compositions, polyamide-based coating compositions, polycarbonate-based coating compositions, polycarbamate-based coating compositions, and aminoplast-based coating compositions (including coating compositions comprising urea-formaldehyde and/or melamine-formaldehyde resins).

In some examples, the first coating composition comprises a basecoat and the second coating composition comprises a clearcoat comprising (1) a reaction product of the crosslinking reactions between the polyfunctional polymeric resin (e.g., a polyol resin and/or a polyamine resin) and the polyisocyanate (e.g., a urethane-containing and/or urea-containing reaction product), and (2) one or more of (2a) a polymerization reaction product of the 1,1-di-activated vinyl compound, or a multifunctional form thereof, or a combination thereof, and/or (2b) an addition reaction product of (i) the polyfunctional polymeric resin and (ii) a 1,1-di-activated vinyl compound, or a multifunctional form thereof, or a combination thereof. As used in this specification, the term "basecoat" means a coating layer that is deposited onto a primer and/or directly onto a substrate, optionally including components (such as pigments) that impact the color and/or provide other visual impact. As used in this specification, the term "topcoat" means a coating layer that is deposited over another coating layer such as a basecoat. Topcoats are often, but not always, "clearcoats," which as used in this specification means a coating layer that is at least substantially transparent or fully transparent to visible light. As used in this specification, the term "substantially transparent" refers to a coating wherein a surface beyond the coating is at least partially visible to the naked eye when viewed through the coating. As used in this specification, the term "fully transparent" refers to a coating wherein a surface beyond the coating is completely visible to the naked eye when viewed through the coating. It is appreciated that a clearcoat can comprise colorants, such as pigments, provided that the colorants do not interfere with the desired transparency of the clearcoat layer. In some examples, a clearcoat layer is free of added colorants such as pigments. As used in this specification, the term "tiecoat" means a coating layer that is located between two other coating layers, such as, for example, a coating layer located between a basecoat layer and a topcoat layer.

In examples where the coating composition comprises (A) a polyol resin; and (B) a crosslinker composition comprising: (b1) a polyisocyanate compound; and (b2) a 1,1-di-activated vinyl compound, or a multifunctional form thereof, or a combination thereof, and the coating composition is formulated as a clearcoat, the 1,1-di-activated vinyl compound and/or the multifunctional form thereof can function as a reactive diluent and solids enhancer that decreases the viscosity of the coating composition without decreasing the solids content of the coating composition. The 1,1-di-activated vinyl compound and/or the multifunctional form thereof can also improve the visual appearance and physical properties of clearcoat layers, including decreasing longwave surface texture, decreasing shortwave surface texture, increasing distinctness of image, and increasing scratch and mar resistance and gloss retention.

The multi-layer coatings described in this specification can comprise a primer coating layer, which can correspond to a first coating layer. As used in this specification, a "primer coating layer" means an undercoating that may be deposited onto a substrate in order to prepare the surface for application of a protective or decorative coating system. A primer coating layer can be formed over at least a portion of the substrate as a first coating layer and a second coating layer (e.g., a basecoat) can be formed over at least a portion of the primer coating layer. As such, the multi-layer coating of the present invention can comprise a primer coating layer and one or more of a basecoat layer and a topcoat layer. In such examples, the topcoat layer can comprise a clearcoat comprising (1) a reaction product of the crosslinking reactions between the polyfunctional polymeric resin (e.g., a polyol resin and/or a polyamine resin) and the polyisocyanate (e.g., a urethane-containing and/or urea-containing reaction product), and (2) one or more of (2a) a polymerization reaction product of the 1,1-di-activated vinyl compound, or a multifunctional form thereof, or a combination thereof, and/or (2b) an addition reaction product of (i) the polyfunctional polymeric resin and (ii) a 1,1-di-activated vinyl compound, or a multifunctional form thereof, or a combination thereof.

A primer coating layer can be formed from a coating composition that comprises a film-forming resin such as a cationic based resin, an anionic based resin, and/or any of the additional film-forming resins previously described. The coating composition used to form the primer coating composition can include a corrosion inhibitor, particularly in coating formulations intended for use on metallic substrates. As used in this specification, a "corrosion inhibitor" means a component reduces the rate or severity of corrosion of a surface on a metal or metal alloy substrate.

A corrosion inhibitor can include, but is not limited to, an alkali metal component, an alkaline earth metal component, a transition metal component, or combinations of any thereof. The term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb), and sodium (Na). The term "alkaline earth metal" refers to an element of Group 2 (IUPAC) of the periodic table of the chemical elements, and includes, e.g., barium (Ba), beryllium (Be), calcium (Ca), magnesium (Mg), and strontium (Sr). The term "transition metal" refers to an element of Groups 3 through 12 (IUPAC) of the periodic table of the chemical elements, and includes, e.g., titanium (Ti), zirconium (Zr), chromium (Cr), and zinc (Zn), among various others. Examples of inorganic components that can function as corrosion inhibitors in primer coating compositions include magnesium oxide, magnesium hydroxide, magnesium carbonate, magnesium phosphate, magnesium silicate, zinc oxide, zinc hydroxide, zinc carbonate, zinc phosphate, zinc silicate, zinc dust, and combinations thereof.

The components of a primer coating composition can be selected to form an electrodepositable coating composition. As used in this specification, the term "electrodepositable coating composition" refers to a coating composition that is capable of being deposited onto an electrically conductive substrate under the influence of an applied electrical potential. Examples of electrodepositable coating compositions include anionic and cationic electrodepositable coating compositions, such as epoxy or polyurethane-based coatings, such as the electrodepositable coatings described in U.S. Pat. No. 4,933,056 at column 2, line 48 to column 5, line 53; U.S. Pat. No. 5,530,043 at column 1, line 54 to column 4, line 67; U.S. Pat. No. 5,760,107 at column 2, line 11 to column 9, line 60; and U.S. Pat. No. 5,820,987 at column 3, line 48 to column 10, line 63, each of which is incorporated by reference into this specification. Suitable electrodepositable coating compositions also include those commercially available from PPG Industries, Inc., such as the POWERCRON® series of anodic and cathodic epoxy and acrylic coatings, ED-6060C, ED-6280, ED-6465, and ED-7000, for example.

As described above, a primer coating composition can be deposited as a first coating layer directly over at least a portion of a substrate before application of a second coating layer. Alternatively, a first coating layer can be deposited over a cured primer coating layer where the first coating layer functions as a basecoat layer, and a second coating layer deposited over the first coating layer where the second coating layer functions as a topcoat layer or a tiecoat layer (when a subsequent layer is applied over the second coating layer). Once a primer coating composition is applied to at least a portion of a substrate, the primer coating layer can be dehydrated and/or cured before applying an overcoating layer, whether a basecoat or a topcoat. A primer coating composition can be dehydrated and/or cured, for example, at a temperature of 175° C. to 205° C. to form a primer coating layer.

The coating composition described in this specification can be used to form a topcoat layer such as, for example, a coating composition formulated to produce (1) an isocyanate-crosslinked polyurethane clearcoat also comprising (2) one or more of (2a) a polymerization reaction product of a 1,1-di-activated vinyl compound, or a multifunctional form thereof, or a combination thereof, and/or (2b) an addition reaction product of (i) a polyol resin and (ii) a 1,1-di-activated vinyl compound, or a multifunctional form thereof, or a combination thereof. Additional examples of topcoat layers that can be used with the multi-layer coating of the present invention include those described in U.S. Pat. No. 4,650,718 at column 1, line 62 to column 10, line 16; U.S. Pat. No. 5,814,410 at column 2, line 23 to column 9 line 54; and U.S. Pat. No. 5,891,981 at column 2, line 22 to column 12, line 37, each of which is incorporated by reference into this specification. Suitable topcoat coating compositions that can be used to form a topcoat layer over the coating compositions described in this specification also include those commercially available from PPG Industries, Inc. under the trademarks NCT®, DIAMOND COAT®, and CERAMICLEAR®.

As described above, in the multi-layer coatings of the present invention, the second coating layer can comprise (1) a reaction product of the crosslinking reactions between a polyfunctional polymeric resin (e.g., a polyol resin and/or a polyamine resin) and a polyisocyanate (e.g., a urethane-containing and/or urea-containing reaction product), and (2) one or more of (2a) a polymerization reaction product of a 1,1-di-activated vinyl compound, or a multifunctional form thereof, or a combination thereof, and/or (2b) an addition reaction product of (i) the polyfunctional polymeric resin and (ii) a 1,1-di-activated vinyl compound, or a multifunctional form thereof, or a combination thereof. As described, the 1,1-di-activated vinyl compound can comprise, for example, a methylene dicarbonyl compound, a dihalo vinyl compound, a dihaloalkyl disubstituted vinyl compound, or a cyanoacrylate compound, or a multifunctional form of any thereof, or a combination of any thereof.

In some examples of the multi-layer coating, the second coating layer can comprise an addition reaction product of (1) a polyol resin, a polyamine resin, a polythiol resin, or a polycarbamate resin, or a combination of any thereof, and (2) a dialkyl methylene malonate, a diaryl methylene malonate, a multifunctional form of a dialkyl methylene malonate, or a multifunctional form of a diaryl methylene malonate, or a combination of any thereof. For instance, the second coating layer can comprise an addition reaction product of (1) a polyol resin, a polyamine resin, a polythiol resin, or a polycarbamate resin, or a combination of any thereof, and (2) diethyl methylene malonate and a multifunctional form of diethyl methylene malonate. The multifunctional form of diethyl methylene malonate can comprise a transesterification adduct of diethyl methylene malonate and at least one polyol. The transesterification adduct of the diethyl methylene malonate and the at least one polyol can comprise a transesterification adduct of diethyl methylene malonate and a diol (e.g., an alkane diol such as 1,5-pentanediol or 1,6-hexanediol).

In some examples of the multi-layer coating, the second coating layer can be formed from a coating composition including a promoter (e.g., a strong acid such as a sulfonic acid and/or a heteropoly acid) and/or an activator (e.g., an amine such as a tertiary amine like DABCO or DMAE/DMEA). In some examples, the first coating layer comprises an activator compound that activated addition reactions in the second coating layer when the second coating layer was applied over the first coating layer.

In some examples, the second coating layer comprises (1) an addition reaction product of the polyfunctional resin and the 1,1-di-activated vinyl compound and/or multifunctional form thereof, and/or (2) a polymerization reaction product of the 1,1-di-activated vinyl compound and/or multifunctional form thereof, and the first coating layer comprises a coating composition that cures when heated at a temperature of less than 500° C., less than 200° C., less than 150° C., less than 140° C., less than 130° C., less than 120° C., less than 100° C., or less than 90° C. The coating composition that forms the first coating layer can comprise, for example, polyurethane-based coating compositions, polyurea-based coating compositions, acrylic-based coating compositions, epoxy-based coating compositions, polyester-based coating compositions, polyether-based coating compositions, polythioether-based coating compositions, polyamide-based coating compositions, polycarbonate-based coating compositions (including cyclic carbonate functional polymers), polycarbamate-based coating compositions, and aminoplast-based coating compositions (including coating compositions comprising urea-formaldehyde and/or melamine-formaldehyde resins). In some examples, the first coating layer comprises a coating composition that does not comprise (i.e., is substantially free of) melamine resin and formaldehyde condensates. The term "substantially free," as used in this specification, means that the described materials are present, if at all, at incidental impurity levels, generally less than 1000 parts per million (ppm) by weight based on total coating composition weight.

In examples where the coating composition comprises (A) a polyfunctional resin (e.g., a polyol resin); and (B) a crosslinker composition comprising: (b1) a polyisocyanate compound; and (b2) a 1,1-di-activated vinyl compound, or a multifunctional form thereof, or a combination thereof, and the coating composition is formulated as a clearcoat, the clearcoat can be applied as the second coating layer over a first coating layer comprising a low-temperature cure basecoat. As used herein, a "low-temperature cure basecoat" is formed from a coating composition that cures at a temperature of 140° C. or less. Examples of low-temperature cure basecoats include, for example, keto-hydrazide basecoat compositions, acid-carbodiimide basecoat compositions, and combinations thereof.

Suitable keto-hydrazide basecoat compositions, acid-carbodiimide basecoat compositions, and combinations thereof can comprise a latex resin comprising an aqueous colloidal dispersion of core-shell particles. The core-shell particles can comprise a polymeric core comprising a (meth)acrylate polymer, a vinyl polymer, or a combination thereof. As used herein, the term "(meth)acrylate" refers to both the methacrylate and the acrylate. The core-shell particles can comprise a polymeric shell comprising a polyurethane with a polymeric backbone that includes urethane linkages and urea linkages. The polymeric core and/or polymeric shell can also comprise keto functional groups, aldo functional groups, carboxylic acid functional groups (including carboxylate salts thereof such as amine salts), or combinations of any thereof.

The core-shell particles can be prepared with: (i) ethylenically unsaturated monomers; (ii) polyurethane prepolymers comprising isocyanate functional groups, carboxylic acid functional groups, and ethylenically unsaturated groups; and (iii) the Michael addition reaction product of a diamine and keto- and/or aldo-containing unsaturated monomers. The resulting core-shell particles can comprise a polymeric core prepared from the ethylenically unsaturated monomers that is chemically bonded to at least a portion of a polyurethane shell having pendant carboxylic acid functional groups, pendant keto and/or aldo functional groups, urethane linkages, and urea linkages. The polymeric core can also include pendant and/or terminal functional groups, such as keto and/or aldo functional groups, by using ethylenically unsaturated monomers that comprise keto and/or aldo functional groups.

The core-shell particles can also be prepared with: (i) ethylenically unsaturated monomers; (ii) polyurethane prepolymers comprising isocyanate functional groups, carboxylic acid functional groups, terminal keto and/or aldo functional groups, and, optionally, ethylenically unsaturated groups; and (iii) a diamine. The resulting core-shell particles comprise a polymeric core prepared from the ethylenically unsaturated monomers and a polyurethane shell having pendant carboxylic acid functional groups, terminal keto and/or aldo functional groups, urethane linkages, and urea linkages. The polymeric core can also include pendant and/or terminal functional groups, such as keto and/or aldo functional groups, by using ethylenically unsaturated monomers that comprise keto and/or aldo functional groups. Further, the polymeric core can be chemically bonded to at least a portion of the polymeric shell if the polyurethane prepolymer comprises ethylenically unsaturated groups.

A basecoat composition can comprise the core-shell particles and suitable crosslinker compounds comprising two or more functional groups that are reactive with the keto functional groups, aldo functional groups, and/or carboxylic acid functional groups on the latex particles. Examples of suitable crosslinker compounds include polyhydrazides, which are reactive with keto and aldo functional groups, and polycarbodiimides, which are reactive with carboxylic acid functional groups. The crosslinker compounds can react with the core-shell particles to cure coating layers formed from the basecoat composition.

The present invention further includes an article comprising the multi-layer coatings formed from the coating compositions described in this specification. For example, the coating compositions can be applied to a wide range of substrates including vehicle components and components of free-standing structures such as buildings, bridges, or other civil infrastructures. More specific substrates include, but are not limited to, automotive substrates (e.g., body panels and other parts and components), industrial substrates, aircraft components, watercraft components, packaging substrates (e.g., food and beverage cans), wood flooring and furniture, apparel, electronics (e.g., housings and circuit boards), glass and transparencies, sports equipment (e.g., golf balls, and the like), appliances (e.g., dish washing machines, clothes washing machines, clothes drying machines). Substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, fiberboard, cement, concrete, brick, stone, paper, cardboard, textiles, leather (both synthetic and natural), glass or fiberglass composites, carbon fiber composites, mixed fiber (e.g., fiberglass and carbon fiber) composites, and the like. "Green" polymers, in this context, refers to polymers that are naturally occurring or synthetic polymers that are biodegradable. A Further description of "Green" Polymers can be understood as described in the Journal of Polymer Degradation and Stability, Volume 68, Issue 1, pages 1-7, The substrate can be one that has been already treated in some manner, such as to impart visual and/or color effect, a protective pretreatment or primer coating layer, or other coating layer, and the like.

The coating compositions of the present invention are also suitable for use as packaging coatings. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. Coatings for cans subjected to relatively stringent temperature and/or pressure requirements should also be resistant to popping, corrosion, blushing and/or blistering.

Accordingly, the present invention is further directed to a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is a metal can. The term "metal can" includes any type of metal can, container, or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "E-Z open ends," which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like. The coating can be applied to the interior and/or the exterior of the package.

In some examples, the coating compositions prepared and used according to the present invention may be substantially free, may be essentially free, and/or may be completely free of bisphenol A and epoxy compounds derived from bisphenol A ("BPA"), such as bisphenol A diglycidyl ether ("BADGE"). The term "substantially free" as used in this context means the coatings compositions contain less than 1000 parts per million (ppm), "essentially free" means less than 100 ppm, and "completely free" means less than 20 parts per billion (ppb) of any of the above mentioned compounds, derivatives, or residues thereof.

WORKING EXAMPLES

The following working examples are intended to further describe the invention. It is understood that the invention described in this specification is not necessarily limited to the examples described in this section.

Example 1: A Multi-Layer Coating System Comprising a 1,1-Di-Activated Vinyl Compound-Containing Clearcoat Over a Water-Borne Basecoat A water-borne basecoat system comprising two coating layers was applied over a 4-inch by 12-inch cold-rolled steel substrate panel pre-coated with ED-6465 electrocoat (electrocoat available from PPG Industries, Inc., and substrate panels available in pre-coated form from ACT Test Panels LLC). The coating layers were applied under controlled conditions of 20-22° C. temperature and 60-65% relative humidity. The first coating layer of the basecoat system (Basecoat A, described below) was sprayed over the electrocoat on the substrate panel using a Binks model 95AR Conventional Air Spray Gun with a 1.8 millimeter nozzle at 60 psi. The first coating layer of the basecoat system was allowed to dry for 5 minutes under ambient conditions.

Basecoat A was a red pigmented basecoat composition, suitable for use as the first basecoat layer in a multi-layer coating system, prepared in the following manner. Components 1-9 listed in Table 1 below were mixed under stirring to form an aqueous phase mixture. The red tint (Component 10) and the white tint (Component 11) were then added to the aqueous phase mixture. Components 12-18 were mixed to form an organic phase mixture and stirred for 15 minutes before being added to the aqueous phase mixture. After mixing the aqueous and organic phase mixtures together, the pH of the combined mixture was adjusted to 8.6 using 50% dimethylethanolamine. The resulting Basecoat A composition was aged for 24 hours under ambient conditions before viscosity adjustment with demineralized water. The high shear viscosity of the Basecoat A composition was adjusted to 95 cps at 1000 sec−1 using a Brookfield CAP 2000 viscometer with spindle #1.

TABLE 1

| No. | Component | Parts by weight |
|---|---|---|
| | Aqueous Phase Components | |
| 1 | Polyester A [1] | 496.3 |
| 2 | Latex A [2] | 439.2 |
| 3 | Latex B [3] | 577.0 |
| 4 | Demineralized water | 107.0 |
| 5 | Dimethylethanolamine | 1.2 |
| 6 | Byk 348 [4] | 2.2 |
| 7 | Byk 032 [5] | 16.4 |
| 8 | 2-Ethylhexanol | 158.6 |
| 9 | Mineral spirits | 36.5 |
| 10 | Red tint paste [6] | 1270.2 |
| 11 | White tint paste [7] | 3.6 |
| | Organic Phase Ingredients | |
| 12 | Urethane diol [8] | 82.8 |
| 13 | Resimene HM2608 [9] | 115.1 |
| 14 | Cymel 1158 [10] | 70.5 |
| 15 | Polyester B [11] | 46.1 |
| 16 | 2-Ethylhexanol | 23.7 |
| 17 | Ethylene glycol monobutyl ether | 77.1 |
| 18 | Propylene glycol monobutyl ether | 66.4 |

[1] Polyester A was made with 73 parts-by-weight of Empol 1008, 2.6 parts-by-weight of trimellitic anhydride, 5.2 parts-by-weight of dimethylol propionic acid, and 19.1 parts-by-weight of 1,4 cyclohexane dimethanol, and had a weight average molecular weight (Mw) of 24,160 as measured by GPC, an acid value of 15.5, and a solids content of 20%.
[2] Latex A was made with 4.1 parts-by-weight dimethylethanolamine, 3.9 parts-by-weight hexanediol diacrylate, 9.7 parts-by-weight 2-ethylhexyl acrylate, 24.9 parts-by-weight methyl methacrylate, 5.9 parts-by-weight dimethylol propionic acid, 5.8 parts-by-weight hydroxyethyl methacrylate, 29.5 parts-by-weight polytetramethylene ether glycol (Mw = 1000), and 16.4 parts-by-weight isophorone diisocyanate, and had a solids content of 37.8% in water.
[3] Latex B was made with 0.2 parts-by-weight dimethyl ethanolamine, 8.8 parts-by-weight acrylamide, 63 parts-by-weight butyl acrylate, 25 parts-by-weight hexanediol diacrylate, 2 parts-by-weight methyl methacrylate, and 1 part-by-weight butyl acrylate, and had a solids content of 31% in water.
[4] Commercially available from Byk Chemie.
[5] Commercially available from Byk Chemie.
[6] Pigment dispersion as described in comparative Example 1 of U.S. Pat. No. 9,040,621.
[7] White tint paste comprising 61% TiO2 dispersed in 9% aqueous acrylic polymer blend, and having a solids of 70%.
[8] The urethane diol was made with 70.1 parts-by-weight of polyoxypropylene diamine (Mw = 400) and 29.9 parts-by-weight of ethylene carbonate.
[9] Commercially available from Ineos Melamines.
[10] Commercially available from Allnex.
[11] Polyester B was made with 39.2 parts-by-weight isostearic acid, 23.8 parts-by-weight cyclohexane dicarboxylic acid, 37 parts-by-weight trimethylol propane, and had a number average molecular weight (Mn) of 726 and an acid value of 2.

The second coating layer of the basecoat system (Basecoat B, described below) was sprayed over the dried first coating layer of the basecoat system using a Binks model 95AR Conventional Air Spray Gun with a 1.8 millimeter nozzle at 60 psi. The second coating layer was sprayed in two consecutive coats without any intermediate drying between spray applications. The two coating layers of the basecoat system where then allowed to dry for 5 minutes under ambient conditions and thereafter dehydrated for 7 minutes at 70° C. The film thickness of the basecoat system (both coating layers) after dehydrating was approximately 34-40 micrometers.

Basecoat B was a metallic red pigmented basecoat composition, suitable for use as the second basecoat layer in a multi-layer coating system, prepared in the following manner. Components 1-12 listed in Table 2 below were mixed under stirring to form an aqueous phase mixture. Components 13 and 14 were then mixed separately for about 20 minutes until the mixture was clear and then added to the rest of the aqueous phase components under stirring. Components 15-18 were mixed to form an organic phase mixture and stirred for 15 minutes prior to being added to the aqueous phase mixture. After mixing the aqueous and organic phase mixtures together, the pH of the combined mixture was adjusted to 8.8 using 50% dimethylethanolamine. The resulting Basecoat B composition was aged for 24 hours under ambient conditions before viscosity adjustment with demineralized water. The high shear viscosity of the Basecoat B composition was adjusted to 80 cps at 1000 sec−1 using a Brookfield CAP 2000 viscometer with spindle #1

TABLE 2

| No. | Components | Parts by weight |
|---|---|---|
| | Aqueous Phase Ingredients | |
| 1 | Polyester A | 643.6 |
| 2 | Latex A | 450.7 |
| 3 | Latex C [1] | 290.0 |
| 4 | Demineralized water | 86.7 |
| 5 | Dimethylethanolamine | 3.5 |
| 6 | Byk 348 | 1.46 |
| 7 | Byk 032 | 15.56 |
| 8 | 2-Ethylhexanol | 80.3 |
| 9 | Propylene glycol monobutyl ether | 76.4 |
| 10 | Mineral spirits | 119.7 |
| 11 | Red tint paste | 518.3 |
| 12 | Synolox 100-D45 [2] | 15.8 |
| 13 | Demineralized water | 583.9 |
| 14 | Laponite RD [3] | 11.7 |
| | Organic Phase Ingredients | |
| 15 | Resimene HM2608 | 221.5 |
| 16 | Aluminium paste [4] | 153.1 |
| 17 | Polyester B | 45.0 |
| 18 | Propylene glycol monobutyl ether | 141.6 |

[1] Latex C was made with 8.8 parts-by-weight of 50% acrylamide, 63 parts-by-weight n-butyl methacrylate, 25.6 parts-by-weight 1,6-hexanediol diacrylate, 1.7 parts-by-weight methyl methacrylate, 0.9 parts-by-weight n-butyl acrylate, and had a solids content of 25% in water.
[2] Polypropylene glycol available from Dow Chemical.
[3] Sodium lithium magnesium silicate available from Southern Clay Products.
[4] TSB 2180A aluminum paste available from Toyal America.

Clearcoat compositions (experimental and control) were applied over the dehydrated basecoat system (the first coating layer, consisting of both Basecoat A and Basecoat B) to form the second coating layers on the substrate panels. The clearcoat compositions comprised the components listed in Table 3.

TABLE 3

| Component | Experimental Clearcoat (parts by weight/grams) | Control Clearcoat (parts by weight/grams) |
|---|---|---|
| Resin D [1] | 120.0 | 120.0 |
| Crosslinker [2] | 60.0 | 60.0 |
| DEMM Hexanediol Composition [3] | 9.0 | 0.0 |

[1] The resin component of a 2K isocyanate-cured polyurethane clearcoat, described below (see U.S. Pat. No. 7,005,472 B2, Example 20).
[2] A mixture of 28.9 parts-by-weight DESMODUR N-3390 (a 90% solids hexamethylene diisocyanate (HDI) trimer (isocyanurate ring) available from Covestro LLC) and 1.3 parts-by-weight phenyl acid phosphate solution (75 percent by weight in isopropanol).
[3] A mixture of diethyl methylene malonate and a transesterification adduct of diethyl methylene malonate and 1,6-hexanediol, as described in U.S. Publication No. 2014/0329980.

Resin D was prepared by mixing the components listed in Table 4 under agitation in the listed order.

TABLE 4

| Components | Parts by weight |
|---|---|
| Methyl amyl ketone | 35.0 |
| Ethyl 3-ethoxy propionate | 11.9 |
| Silica dispersion [1] | 8.6 |
| TINUVIN 928 [2] | 3.0 |
| CYMEL 202 [3] | 18.8 |
| Acrylic polyol [4] | 47.2 |
| Polyester polyol [5] | 25.3 |
| polysiloxane polyol [6] | 10.4 |
| TINUVIN 292 [7] | 0.5 |
| Flow additive [8] | 0.5 |

[1] Silica dispersion prepared as follows: a 4-neck reaction flask equipped for vacuum distillation was flushed with N₂. To the reaction flask was added 1051.1 parts-by-weight of a siloxane polyol, 1125.8 parts-by-weight of ORGANOSILICASOL MT-ST-M (colloidal silica from Nissan Chemicals), and 480.3 parts-by-weight of methyl amyl ketone. The resulting mixture was vacuum distilled at 25° C. for 4 hours. The siloxane polyol was prepared beforehand by reacting 131.54 parts-by-weight of trimethylolpropane monoallyl ether and 93.21 parts-by-weight of MASILWAX BASE (a polysiloxane-containing silicon hydride available from BASF Corporation).
[2] 2-(2H-Benzotriazol-2yl)-6-(1-methyl-1-phenylethyl)-4-(1,1,3,3-tetramethylbutyl)phenol UV absorber available from Ciba Specialty Chemicals Corp.
[3] High imino, methylated/butylated melamine formaldehyde resin available from Cytec Industries, Inc.
[4] Acrylic polyol: (34.8 wt % HEMA; 23.4 wt % 2-EHMA; 20.8 wt % 2-EHA; 20 wt % Styrene; 1 wt % MAA), 51% in 1:1 xylene:butyl acetate, having a weight average molecular weight of 7200, a number average molecular weight of 2850 based on gel permeation chromatography using polystyrene standards.
[5] Polyester polyol: (32 wt % 4-methyl hexahydrophthalic anhydride; 22.9 wt % 1,6-hexane diol; 18.6 wt % trimethylol propane; 18.4 wt % adipic acid; 8.1 wt % trimethyl pentane diol), 80% in 60:40 butyl acetate:Solvesso 100, having a hydroxyl value of 145 and a Gardner-Holte viscosity of X-Z.
[6] A siloxane polyol prepared by reacting 131.54 parts-by-weight of trimethylolpropane monoallyl ether and 93.21 parts-by-weight of MASILWAX BASE (a polysiloxane-containing silicon hydride available from BASF Corporation).
[7] Hindered amine light stabilizer available from Ciba-Geigy Corp.
[8] Polybutylacrylate (60 percent solids in xylene).

The clearcoat layers were sprayed over the dehydrated basecoat system on the substrate panels using a Binks model 95AR Conventional Air Spray Gun with a 1.8 millimeter nozzle at 60 psi. The clearcoat layers were sprayed in two consecutive coats without any intermediate drying between spray applications. The clearcoat layers were then allowed to dry for 7 minutes under ambient conditions and thereafter the multi-layer coatings were baked for 30 minutes 140° C., in either horizontal or vertical orientation. The film thicknesses of the clearcoat layers after the bake were approximately 50-51 micrometers.

The experimental and control multi-layer coatings were evaluated for the appearance and physical properties listed in Table 5.

As shown in Table 5, the experimental multi-layer coating exhibited better scratch resistance, distinctness of image, and longwave and shortwave texture evaluations than the control multi-layer coating. The hardness values of the experimental and control multi-layer coatings were comparable.

Example 2: A Multi-Layer Coating System Comprising a 1,1-Di-Activated Vinyl Compound-Containing Clearcoat Over a Low-Temperature Cure Basecoat A low-temperature cure basecoat was applied over 4-inch by 12-inch cold-rolled steel substrate panels pre-coated with ED-6465 electrocoat (electrocoat available from PPG Industries, Inc., and substrate panels available in pre-coated form from ACT Test Panels LLC). The basecoat composition was prepared with the components listed in Table 6.

TABLE 6

| Component | Part by weight (grams) |
|---|---|
| Latex [1] | 196.62 |
| Adipic acid dihydrazide | 2.41 |
| CARBODILITE ® V-02-L2 [2] | 9.88 |
| Black tint [3] | 50.48 |
| Red tint [4] | 15.95 |
| BYK ® 348 [5] | 0.43 |
| BYK ® 032 [6] | 1.73 |
| BYKETOL ® WS [7] | 11.12 |
| SURFYNOL ® 104E [8] | 11.38 |
| Deionized water | 53.00 |

[1] Described below.
[2] Waterborne carbodiimide crosslinker with a hydrophilic segment, available from GSI Exim America, Inc.
[3] Black tint paste consisting of 6% carbon black dispersed in 15% aqueous acrylic polymer and having a solids content of 22%.
[4] Red tint paste consisting of 13% transparent iron oxide red dispersed in 13% aqueous acrylic polymer and having a solids content of 27%.
[5] Polyether modified siloxane, available from BYK-Chemie GmbH.
[6] Emulsion of paraffin-based mineral oils and hydrophobic components, available from BYK-Chemie GmbH.
[7] Silicone-free surface additive, available from BYK-Chemie GmbH.
[8] Surfactant, available from Air Products and Chemicals, Inc.

The basecoat composition was prepared by mixing the components listed in Table 6 with a conventional stir blade while preventing foaming and air entrapment. The latex component was prepared beforehand as follows:

TABLE 5

| Example | Panel Orientation[1] | Longwave[2] | Shortwave[3] | DOI[4] | Hardness[5] | Scratch Resistance[6] |
|---|---|---|---|---|---|---|
| Control | Horizontal | 6.3 | 33.0 | 90.0 | 148.2 | 65.9% |
|  | Vertical | 13.7 | 35.5 | 87.9 | 148.3 |  |
| Experimental | Horizontal | 4.5 | 24.4 | 93.1 | 147.8 | 81.6% |
|  | Vertical | 11.4 | 28.1 | 91.8 | 147.4 |  |

[1]Orientation of the panel during the ambient dry and baking operations.
[2]Longwave surface texture was measured with a BYK Wave-scan Dual instrument (available from BYK Additives & Instruments) following the instrument's instrument manual (lower longwave values are generally considered more aesthetic and desirable in coating compositions).
[3]Shortwave surface texture was measured with a BYK Wave-scan Dual instrument (available from BYK Additives & Instruments) following the instrument's instrument manual (lower shortwave values are generally considered more aesthetic and desirable in coating compositions).
[4]Distinctness of image was measured with a BYK Wave-scan Dual instrument (available from BYK Additives & Instruments) following the instrument's instrument manual (higher DOI values are generally considered more aesthetic and desirable in coating compositions).
[5]Hardness values were measured in Fischer Microhardness (FMH) units using an HM2000 Fischer Microhardness instrument (available from Fischer Technology, Inc.) (hardness was measured two weeks after application of the multi-layer coatings).
[6]Scratch Resistance was measured with a BYK Wave-scan Dual instrument (available from BYK Additives & Instruments) and an Atlas AATCC Scratch Tester, Model CM-5 (available from Atlas Electrical Devices Company) in accordance with ASTM D6037 - 13e1: *Standard Test Methods for Dry Abrasion Mar Resistance of High Gloss Coatings* (Test Method B - 10 double rubs with No. 10 abrasive paper and a 500 gram load) (the percentage values shown are 20° gloss retention calculated as: 100 * [(gloss after scratch)/(gloss before scratch)]; higher values are indicative of a more scratch-resistance coating and thus more desirable).

First, a polyurethane was prepared by charging the components listed in Table 7 into a four necked round bottom flask fitted with a thermocouple, mechanical stirrer, and condenser.

TABLE 7

| Component | Part by weight (grams) |
| --- | --- |
| butyl acrylate | 538 |
| FOMREZ ® 66-56 [1] | 433 |
| POLYMEG ® 2000 polyol [2] | 433 |
| 2,6-di-tert-butyl 4-methyl phenol | 3.1 |
| hydroxyethyl methacrylate (HEMA) | 41.4 |
| dimethylol propionic acid (DMPA) | 140 |
| triethylamine | 6.3 |

[1] Hydroxyl-terminated, saturated linear polyester polyol, available from Chemtura Corp.
[2] Polytetramethylene ether glycol, available from LyondellBasell Industries N.V.

The mixture was heated to 50° C. and held for 15 minutes. Next, 601.0 parts-by-weight (grams) of isophorone diisocyanate was charged into the flask over 10 minutes, and mixed for 15 minutes. After mixing, 39 parts-by-weight (grams) of butyl acrylate and 1.6 parts-by-weight (grams) of dibutyl tin dilaurate (DBTDL) was charged into the flask and immediate exotherm was observed. After exotherm subsided, the mixture was heated to 90° C. and held for 60 minutes. The mixture was cooled to 70° C. and 538 grams of butyl acrylate and 94.0 grams of hexanediol diacrylate were charged into the flask. The resulting mixture was kept at 60° C. before being dispersed into water and then allowed to cool to ambient temperature to provide the polyurethane product.

The polyurethane product was used to produce the latex. The latex comprised polyurethane-acrylic shell-core particles with urea linkages, urethane linkages, pendant carboxylic acid functionality, and pendant keto functionality on the polyurethane shell. The latex was prepared by charging the components listed in Table 8 into a four necked round bottom flask fitted with a thermocouple, mechanical stirrer, and condenser.

TABLE 8

| Component | Part by weight (grams) |
| --- | --- |
| Deionized water | 2400.0 |
| diacetone acrylamide | 215 |
| dimethyl ethanolamine | 88 |
| ethylenediamine | 50 |

The mixture was heated to 70° C. and held for two hours with an $N_2$ blanket. After heating the mixture, 1925 parts-by-weight (grams) of deionized water and 40 parts-by-weight (grams) of AEROSOL® OT-75 (a surfactant, available from Cytec Solvay Group) were charged into the flask and held at 50° C. for 15 minutes. Next, 2600.0 parts-by-weight (grams) of the polyurethane product described above was dispersed into the flask over 20 minutes and mixed for an additional 15 minutes. A mixture of 7.7 parts-by-weight (grams) of ammonium persulfate and 165 parts-by-weight (grams) of deionized water was then charged into the flask over 15 minutes. The temperature rose from 50° C. to 80° C. due to polymerization exotherm. The mixture was held at 75° C. for an additional hour. After cooling to 40° C., 1.2 parts-by-weight (grams) of FOAMKILL® 649 (non-silicone defoamer, available from Crucible Chemical Company), 25 parts-by-weight (grams) of ACTICIDE® MBS (a microbiocide comprising a mixture of 1,2-benzisothiazolin-3-one and 2-methyl-4-isothiazolin-3-one, available from Thor GmbH), and 55 parts-by-weight (grams) of deionized water were charged into the flask and mixed for an additional 15 minutes. The resulting latex had a solids content of 38.6% and an average particle size of 60 nm. The average particle size was determined with a Zetasize 3000HS following the instructions in the Zetasize 3000HS manual.

The basecoat composition (Table 6, above) was applied over the electrocoat on the substrate panels under controlled conditions of 21-24° C. temperature and 50-60% relative humidity. The basecoat composition was applied by spraying the two coats without any intermediate drying between spray applications. The basecoat composition layers were spray applied using a Binks model 95AR Conventional Air Spray Gun with a 1.8 millimeter nozzle at 60 psi. The applied basecoat layers where allowed to dry for 5 minutes under ambient conditions and thereafter dehydrated for 5 minutes at 80° C. The resulting layers had dry film thicknesses of about 1.06 mils (27 micrometers).

Clearcoat compositions (experimental and control) were applied over the dehydrated basecoat to form second coating layers on the substrate panels. The clearcoat compositions comprised the components listed in Table 9.

TABLE 9

| Component | Experimental Clearcoat (parts by weight/grams) | Control Clearcoat (parts by weight/grams) |
| --- | --- | --- |
| Resin [1] | 120.0 | 120.0 |
| Crosslinker [2] | 60.0 | 60.0 |
| DEMM Hexanediol Composition [3] | 9.5 | 0.0 |

[1] Resin D described above in Example 2 (Table 3).
[2] The crosslinker described above in Example 2 (Table 3).
[3] A mixture of diethyl methylene malonate and a transesterification adduct of diethyl methylene malonate and 1,6-hexanediol, as described in U.S. Publication No. 2014/0329980.

The clearcoat layers were sprayed over the dehydrated basecoat on the substrate panels using a Binks model 95AR Conventional Air Spray Gun with a 1.8 millimeter nozzle at 60 psi. The clearcoat layers were sprayed in two consecutive coats without any intermediate drying between spray applications. The clearcoat layers were then allowed to dry for 7 minutes under ambient conditions and thereafter the multi-layer coatings were baked for 30 minutes at 140° C. The film thicknesses of the clearcoat layers after the bake were about 1.8-1.9 mils (46-48 micrometers).

The experimental and control multi-layer coatings were evaluated for the appearance and physical properties listed in Table 10.

TABLE 10

| Example | Longwave [1] | Shortwave [2] | Hardness [3] | DOI[4] |
| --- | --- | --- | --- | --- |
| Control | 7.2 | 32.0 | 115 | 87 |
| Experimental | 5.9 | 13.0 | 115 | 94 |

[1] Longwave surface texture was measured with a BYK Wave-scan Dual instrument (available from BYK Additives & Instruments) following the instrument's instrument manual (lower longwave values are generally considered more aesthetic and desirable in coating compositions).
[2] Shortwave surface texture was measured with a BYK Wave-scan Dual instrument (available from BYK Additives & Instruments) following the instrument's instrument manual (lower shortwave values are generally considered more aesthetic and desirable in coating compositions).
[3] Hardness values were measured in $N/mm^2$ units using an HM2000 Fischer Microhardness instrument (available from Fischer Technology, Inc.) (hardness was measured two weeks after application of the multi-layer coatings).
[4] Distinctness of image was measured with a BYK Wave-scan Dual instrument (available from BYK Additives & Instruments) following the instrument's instrument manual (higher DOI values are generally considered more aesthetic and desirable in coating compositions).

As shown in Table 7, the experimental multi-layer coating exhibited better longwave and shortwave texture evaluations than the control multi-layer coating. The hardness values of the experimental and control multi-layer coatings were comparable.

ASPECTS OF THE INVENTION

Aspects of the invention include, but are not limited to, the following numbered clauses.

1. A coating composition comprising: (A) a polyol resin; and (B) a crosslinker composition comprising: (b1) a polyisocyanate compound; and (b2) a 1,1-di-activated vinyl compound, or a multifunctional form thereof, or a combination thereof; wherein a mixture of components (A) and (B) form a polyurethane coating composition.

2. A coating composition comprising in clause 1, wherein the polyfunctional resin is a polyol.

3. A coating composition comprising in clause 2, wherein the polyfunctional resin is a polyol,
wherein a mixture of components (A) and (B) form a polyurethane coating composition.

4. A coating composition comprising in clause 1, wherein the polyfunctional resin is a polyamine.

5. A coating composition comprising in clause 1, wherein the polyfunctional resin is a polythiol.

6. A coating composition comprising in clause 1, wherein the polyfunctional resin is a polycarboxylic acid 7. The coating composition of clause 1, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or combinations of any thereof.

8. The coating composition of clause 7, wherein the 1,1-di-activated vinyl compound comprises: a dialkyl methylene malonate; a diaryl methylene malonate; a multifunctional form of a dialkyl methylene malonate; or a multifunctional form of a diaryl methylene malonate; or a combination of any thereof.

9. The coating composition of clause 8 wherein the 1,1-di-activated vinyl compound comprises: diethyl methylene malonate; and a multifunctional form of diethyl methylene malonate comprising a transesterification adduct of diethyl methylene malonate and at least one polyol.

10. The coating composition of clause 9, wherein the transesterification adduct of diethyl methylene malonate and at least one polyol comprises a transesterification adduct of diethyl methylene malonate and a diol.

11. The coating composition of clause 10, wherein the diol comprises an alkane diol.

12. The coating composition of clause 11, wherein the alkane diol comprises 1,5-pentane diol and/or 1,6-hexanediol.

13. A coating crosslinker composition comprising: a polyisocyanate compound; and a 1,1-di-activated vinyl compound, or a multifunctional form thereof, or a combination thereof.

14. The coating crosslinker composition of clause 13, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or combinations of any thereof.

15. The coating crosslinker composition of clause 13, wherein the 1,1-di-activated vinyl compound comprises: a dialkyl methylene malonate; a diaryl methylene malonate; a multifunctional form of a dialkyl methylene malonate; or a multifunctional form of a diaryl methylene malonate; or a combination of any thereof.

16. The coating crosslinker composition of clause 15, wherein the 1,1-di-activated vinyl compound comprises: diethyl methylene malonate; and a multifunctional form of diethyl methylene malonate comprising a transesterification adduct of diethyl methylene malonate and at least one polyol.

17. The coating crosslinker composition of clause 16, wherein the transesterification adduct of diethyl methylene malonate and at least one polyol comprises a transesterification adduct of diethyl methylene malonate and a diol.

18. The coating composition of clause 17, wherein the diol comprises an alkane diol.

19. The coating composition of clause 18, wherein the alkane diol comprises 1,5-pentane diol and/or 1,6-hexanediol.

20. A multi-layer coating comprising: a first coating layer applied over at least a portion of a substrate; and a second coating layer applied over at least a portion of the first coating layer; wherein the second coating layer comprises: a reaction product of a polyol resin and a polyisocyanate; and one or more of: an addition reaction product of: a polyol resin; and a 1,1-di-activated vinyl compound, or a multifunctional form thereof, or a combination thereof; and/or a polymerization reaction product of the 1,1-di-activated vinyl compound, or a multifunctional form thereof, or a combination thereof.

21. A multi-layer coating of clause 20 where in the polyfunctional resin is a polyol.

22. A multi-layer coating of clause 20 where in the polyfunctional resin is a polythiol.

23. A multi-layer coating of clause 20 where in the polyfunctional resin is a polyamine.

24. A multi-layer coating of clause 20 where in the polyfunctional resin is a polycarboxylic acid.

25. The multi-layer coating of clause 20, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or combinations of any thereof.

26. The multi-layer coating of clause 20 or clause 21, wherein the second coating layer comprises a polymerization reaction product of diethyl methylene malonate and a multifunctional form of diethyl methylene malonate, wherein the multifunctional form of diethyl methylene malonate comprises a transesterification adduct of diethyl methylene malonate and at least one polyol.

27. The multi-layer coating of clause 26, wherein the transesterification adduct of diethyl methylene malonate and at least one polyol comprises a transesterification adduct of diethyl methylene malonate and a diol.

28. The multi-layer coating of any one of clauses 20-27, wherein the second coating layer comprises an addition reaction product of: (1) the polyol resin; and (2) diethyl methylene malonate and a multifunctional form of diethyl methylene malonate, wherein the multifunctional form of diethyl methylene malonate comprises a transesterification adduct of diethyl methylene malonate and at least one polyol.

29. The multi-layer coating of clause 28, wherein the transesterification adduct of diethyl methylene malonate and at least one polyol comprises a transesterification adduct of diethyl methylene malonate and a diol.

30. The multi-layer coating of any one of clauses 20-25, wherein the first coating layer comprises an activator compound that activated addition reactions and/or polymerization reactions in the second coating layer when the second coating layer was applied over the first coating layer.

31. The multi-layer coating of clause 30, wherein the activator compound comprises a tertiary amine compound.

32. The multi-layer coating of clause 31, wherein the activator compound comprises 2-(dimethylamino)ethanol and/or 1,4-diazabicyclo[2.2.2] octane.

33. The multi-layer coating of any one of clauses 20-32, wherein the first coating layer comprises a first coating composition that cures when heated at a temperature of less than 120° C.

34. The multi-layer coating of any one of the clauses 29-33, wherein the first coating composition does not comprise melamine resin or formaldehyde condensates.

35. The multi-layer coating of any one of clauses 20-34, wherein the first coating layer comprises a first coating composition comprising: a water-borne polyurethane-forming coating composition; a water-borne keto-hydrazide crosslinking coating composition; a water-borne acid-carbodiimide crosslinking coating composition; or a melamine resin; or a combination of any thereof.

36. The multi-layer coating of any one of clauses 20-35, wherein the second coating layer comprises a clearcoat layer.

37. An article comprising the multi-layer coating of any one of clauses 20-36 deposited on a surface of the article.

38. The article of clause 37, wherein the article comprises a vehicle component or a component of a free-standing structure.

39. A process for coating a substrate comprising: applying a first coating layer over at least a portion of a substrate; applying a second coating layer over at least a portion of the first coating layer; and curing the second coating layer; wherein the second coating layer comprises a coating composition comprising: a polyol resin; a polyisocyanate; and a 1,1-di-activated vinyl compound, or a multifunctional form thereof, or a combination thereof.

40. The process of clause 39, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or combinations of any thereof.

41. The process of clause 39 or clause 40, wherein the curing of the second coating layer comprises a multiple-curing mechanism comprising: crosslinking reactions between the polyol resin and the polyisocyanate; and one or more of: polymerization reactions of the 1,1-di-activated vinyl compound, or a multifunctional form thereof, or a combination thereof and/or addition reactions between the polyol resin and the 1,1-di-activated vinyl compound, or a multifunctional form thereof, or a combination thereof.

42. The process of any one of clauses 39-41, wherein: the first coating layer comprises an activator compound; the curing of the second coating layer comprises activating a polymerization reaction and/or an addition reaction in the second coating layer with the activator compound in the first coating layer; and the 1,1-di-activated vinyl compound, or a multifunctional form thereof, or a combination thereof (1) is polymerized and/or (2) reacts with the polyol resin to produce an addition reaction product.

43. The process of clause 42, wherein the activator compound comprises a tertiary amine compound.

44. The process of clause 43, wherein the activator compound comprises 2-(dimethylamino)ethanol and/or 1,4-diazabicyclo[2.2.2] octane.

45. The process of any one of clauses 39-344, wherein the second coating layer, when cured, comprises: a reaction product of the polyol resin and the polyisocyanate; and a polymerization reaction product of diethyl methylene malonate and a multifunctional form of diethyl methylene malonate, wherein the multifunctional form of diethyl methylene malonate comprises a transesterification adduct of diethyl methylene malonate and at least one polyol.

46. The process of clause 45, wherein the transesterification adduct of diethyl methylene malonate and at least one polyol comprises a transesterification adduct of diethyl methylene malonate and a diol.

47. The process of any one of clauses 39-46, wherein the second coating layer, when cured, comprises: a reaction product of the polyol resin and the polyisocyanate; and an addition reaction product of: (1) the polyol resin; and (2) diethyl methylene malonate and a multifunctional form of diethyl methylene malonate, wherein the multifunctional form of diethyl methylene malonate comprises a transesterification adduct of diethyl methylene malonate and at least one polyol.

48. The process of clause 47, wherein the transesterification adduct of diethyl methylene malonate and at least one polyol comprises a transesterification adduct of diethyl methylene malonate and a diol.

49. An article coated with the coating composition of clause 1 or clause 20.

50. An article of clause 49, wherein the article is a free-standing structure or a mobile-entity.

51. An article of clause 50 wherein the free-standing article is a container, metallic can, an industrial component, a building, a bridge, a package, a device or a piece of furniture.

52. An article in clause 50 wherein the mobile entity is an automobile, airplane, helicopter, train, ship, boat or submersible.

Various features and characteristics are described in this specification to provide an understanding of the composition, structure, production, function, and/or operation of the invention, which includes the disclosed compositions, coatings, and processes. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description, sufficiency of description, and added matter requirements, including the requirements under 35 U.S.C. § 112(a) and Article 123(2) EPC.

Any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description, sufficiency of description, and added matter requirements, including the requirements under 35 U.S.C. § 112(a) and Article 123(2) EPC. Also, unless expressly specified or otherwise required by context, all numerical parameters described in this specification (such as those expressing values, ranges, amounts, percentages, and the like) may be read as if prefaced by the word "about," even if the word "about" does not expressly appear before a number. Additionally, numerical parameters described in this specification should be construed in light of the number of reported significant digits, numerical precision, and by applying ordinary rounding techniques. It is also understood that numerical parameters described in this specification will necessarily possess the inherent variability characteristic of the underlying measurement techniques used to determine the numerical value of the parameter.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a composition, coating, or process that "comprises," "has," "includes," or "contains" one or more features and/or characteristics possesses those one or more features and/or characteristics, but is not limited to possessing only those one or more features and/or characteristics. Likewise, an element of a composition, coating, or process that "comprises," "has," "includes," or "contains" one or more features and/or characteristics possesses those one or more features and/or characteristics, but is not limited to possessing only those one or more features and/or characteristics, and may possess additional features and/or characteristics.

The grammatical articles "a," "an," and "the," as used in this specification, including the claims, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

Any patent, publication, or other document identified in this specification is incorporated by reference into this specification in its entirety unless otherwise indicated, but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with written description, sufficiency of description, and added matter requirements, including the requirements under 35 U.S.C. § 112(a) and Article 123(2) EPC.

What is claimed is:

1. A coating composition comprising:
(A) a polyfunctional resin; and
(B) a crosslinker composition comprising:
  (b1) a polyisocyanate compound; and
  (b2) a 1,1-di-activated vinyl compound, or a multifunctional form thereof, or a combination thereof, wherein the 1,1-di-activated vinyl compound comprises a methylene dicarbonyl compound, a dihaloalkyl disubstituted vinyl compound, a multifunctional form of a methylene dicarbonyl compound, a multifunctional form of a dihaloalkyl compound, a multifunctional form of a dihaloalkyl disubstituted vinyl compound, or combination thereof;
wherein a mixture of components (A) and (B) form a coating composition.

2. A coating composition of claim 1, wherein the polyfunctional resin is a polyol.

3. A coating composition of claim 1, wherein the polyfunctional resin is a polyamine.

4. A coating crosslinker composition comprising:
a polyisocyanate compound; and
a 1,1-di-activated vinyl compound, or a multifunctional form thereof, or a combination thereof, wherein the 1,1-di-activated vinyl compound comprises a methylene dicarbonyl compound, a dihaloalkyl disubstituted vinyl compound, a multifunctional form of a methylene dicarbonyl compound, a multifunctional form of a dihaloalkyl compound, a multifunctional form of a dihaloalkyl disubstituted vinyl compound, or combination thereof.

5. A multi-layer coating comprising:
a first coating layer applied over at least a portion of a substrate; and
a second coating layer applied over at least a portion of the first coating layer;
wherein the second coating layer comprises:
  a reaction product of a first polyfunctional resin and a polyisocyanate; and
  one or more of:
    an addition reaction product of:
      a second polyfunctional resin; and
      a 1,1-di-activated vinyl compound, or a multifunctional form
    thereof, or a combination thereof; and/or
    a polymerization reaction product of the 1,1-di-activated vinyl compound, or a multifunctional form thereof, or a combination thereof, wherein the 1,1-di-activated vinyl compound comprises a methylene dicarbonyl compound, a dihaloalkyl disubstituted vinyl compound, a multifunctional form of a methylene dicarbonyl compound, a multifunctional form of a dihaloalkyl compound, a multifunctional form of a dihaloalkyl disubstituted vinyl compound, or combination thereof.

6. A multi-layer coating of claim 5 wherein the first polyfunctional resin, the second polyfunctional resin, or a combination thereof is a polyol.

7. A multi-layer coating of claim 5 wherein the first polyfunctional resin, the second polyfunctional resin, or a combination thereof is a polythiol.

8. A multi-layer coating of claim 5 wherein the first polyfunctional resin, the second polyfunctional resin, or a combination thereof is a polyamine.

9. The multi-layer coating of claim 5, wherein the second coating layer comprises an addition reaction product of:
   (1) a polyfunctional resin comprising a polyol; and
   (2) diethyl methylene malonate and a multifunctional form of diethyl methylene malonate,
   wherein the multifunctional form of diethyl methylene malonate comprises a transesterification adduct of diethyl methylene malonate and at least one polyol.

10. The multi-layer coating of claim 9, wherein the transesterification adduct of diethyl methylene malonate and at least one polyol comprises a transesterification adduct of diethyl methylene malonate and a diol.

11. The multi-layer coating of claim 5, wherein the first coating layer comprises an activator compound that activated addition reactions and/or polymerization reactions in the second coating layer when the second coating layer was applied over the first coating layer.

12. The multi-layer coating of claim 11, wherein the activator compound comprises a tertiary amine compound.

13. The multi-layer coating of claim 5, wherein the second coating layer comprises a clearcoat layer.

14. An article comprising the multi-layer coating of claim 5 deposited on a surface of the article.

15. The article of claim 14, wherein the article comprises a vehicle component or a component of a free-standing structure.

16. A process for coating a substrate comprising:
applying a first coating layer over at least a portion of a substrate;
applying a second coating layer over at least a portion of the first coating layer; and
curing the second coating layer;
wherein the second coating layer comprises a coating composition comprising:
a polyol resin;
polyisocyanate; and
a 1,1-di-activated vinyl compound, or a multifunctional form thereof, or a combination thereof, wherein the 1,1-di-activated vinyl compound comprises a methylene dicarbonyl compound, a dihaloalkyl disubstituted vinyl compound, a multifunctional form of a methylene dicarbonyl compound, a multifunctional form of a dihaloalkyl compound, a multifunctional form of a dihaloalkyl disubstituted vinyl compound, or combination thereof.

17. The process of claim 16, wherein the curing of the second coating layer comprises a multiple-curing mechanism comprising:
crosslinking reactions between the polyol resin and the polyisocyanate; and
one or more of:
polymerization reactions of the 1,1-di-activated vinyl compound, or a multifunctional form thereof, or a combination thereof; and/or
addition reactions between the polyol resin and the 1,1-di-activated vinyl compound, or a multifunctional form thereof, or a combination thereof.

18. The process of claim 16, wherein:
the first coating layer comprises an activator compound;
the curing of the second coating layer comprises activating a polymerization reaction and/or an addition reaction in the second coating layer with the activator compound in the first coating layer; and
the 1,1-di-activated vinyl compound, or a multifunctional form thereof, or a combination thereof (1) is polymerized and/or (2) reacts with the polyol resin to produce an addition reaction product.

19. The process of claim 18, wherein the activator compound comprises a tertiary amine compound.

20. The process of claim 17, wherein the second coating layer, when cured, comprises:
a reaction product of the polyol resin and the polyisocyanate; and
a polymerization reaction product of diethyl methylene malonate and a multifunctional form of diethyl methylene malonate, wherein the multifunctional form of diethyl methylene malonate comprises a transesterification adduct of diethyl methylene malonate and at least one polyol.

21. The process of claim 17, wherein the second coating layer, when cured, comprises:
a reaction product of the polyol resin and the polyisocyanate; and
an addition reaction product of:
(1) the polyol resin; and
(2) diethyl methylene malonate and a multifunctional form of diethyl methylene malonate, wherein the multifunctional form of diethyl methylene malonate comprises a transesterification adduct of diethyl methylene malonate and at least one polyol.

* * * * *